(12) United States Patent
Takahashi

(10) Patent No.: US 12,271,584 B2
(45) Date of Patent: *Apr. 8, 2025

(54) OBJECT DETECTION DEVICE, OBJECT DETECTION METHOD, AND RECORDING MEDIUM

(71) Applicant: NEC Corporation, Tokyo (JP)

(72) Inventor: Yusuke Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,982

(22) Filed: Jan. 19, 2024

(65) Prior Publication Data

US 2024/0160342 A1 May 16, 2024

Related U.S. Application Data

(63) Continuation of application No. 17/752,068, filed on May 24, 2022, now Pat. No. 11,914,851, which is a (Continued)

(30) Foreign Application Priority Data

Mar. 19, 2015 (JP) ................. 2015-055926

(51) Int. Cl.
*G06F 3/04845* (2022.01)
*G06F 3/0354* (2013.01)
(Continued)

(52) U.S. Cl.
CPC ...... *G06F 3/04845* (2013.01); *G06F 3/03543* (2013.01); *G06F 3/04842* (2013.01);
(Continued)

(58) Field of Classification Search
None
See application file for complete search history.

(56) References Cited

U.S. PATENT DOCUMENTS 7,092,548 B2 * 8/2006 Laumeyer ................. G06T 7/11
382/104
9,158,996 B2 10/2015 Yokoi ................. G06K 9/3241
(Continued)

FOREIGN PATENT DOCUMENTS

JP 2003-317082 A 11/2003
JP 2005-293264 A 10/2005
(Continued)

OTHER PUBLICATIONS

International Search Report of PCT/JP2016/001453 dated May 24, 2016 [PCT/ISA/210].
(Continued)

*Primary Examiner* — Delomia L Gilliard
(74) *Attorney, Agent, or Firm* — Sughrue Mion, PLLC

(57) ABSTRACT

Provided is an object detection device or the like which efficiently generates good-quality training data. This object detection device is provided with: a detection unit which uses a dictionary to detect objects from an input image; a reception unit which displays, on a display device, the input image accompanied by a display emphasizing partial areas of detected objects, and receives, from one operation of an input device, a selection of a partial area and an input of the class of the selected partial area; a generation unit which generates training data from the image of the selected partial area and the inputted class; and a learning unit which uses the training data to learn the dictionary.

29 Claims, 27 Drawing Sheets

Related U.S. Application Data continuation of application No. 16/938,462, filed on Jul. 24, 2020, now Pat. No. 11,373,061, which is a continuation of application No. 16/418,456, filed on May 21, 2019, now Pat. No. 10,755,143, which is a continuation of application No. 15/558,652, filed as application No. PCT/JP2016/001453 on Mar. 15, 2016, now Pat. No. 10,339,422.

(51) Int. Cl.
| | | |
|---|---|---|
| G06F 3/04842 | (2022.01) | |
| G06F 3/04847 | (2022.01) | |
| G06F 3/0488 | (2022.01) | |
| G06F 3/04883 | (2022.01) | |
| G06F 18/214 | (2023.01) | |
| G06N 20/00 | (2019.01) | |
| G06N 99/00 | (2019.01) | |
| G06V 10/22 | (2022.01) | |
| G06V 10/774 | (2022.01) | |
| G06V 20/52 | (2022.01) | |

(52) U.S. Cl.
CPC ........ *G06F 3/04847* (2013.01); *G06F 3/0488* (2013.01); *G06F 3/04883* (2013.01); *G06F 18/214* (2023.01); *G06N 99/00* (2013.01); *G06V 10/235* (2022.01); *G06V 10/774* (2022.01); *G06V 20/52* (2022.01); *G06N 20/00* (2019.01)

(56) References Cited

U.S. PATENT DOCUMENTS

| | | | |
|---|---|---|---|
| 2002/0012467 A1 | 1/2002 | Shiratani | G06K 9/66 382/224 |
| 2007/0009152 A1* | 1/2007 | Kanda | G06F 16/5838 382/159 |
| 2009/0102858 A1* | 4/2009 | Eggers | G06V 20/58 345/617 |
| 2010/0014758 A1 | 1/2010 | Yano | G06K 9/6292 382/195 |
| 2011/0091116 A1 | 4/2011 | Yano | G06K 9/6255 382/209 |
| 2011/0229045 A1 | 9/2011 | Yu | G06K 9/00664 382/224 |
| 2011/0289028 A1 | 11/2011 | Sato | G06K 9/623 706/12 |
| 2012/0062732 A1* | 3/2012 | Marman | G06T 7/277 348/142 |
| 2018/0107900 A1* | 4/2018 | Takahashi | G06V 20/52 |
| 2019/0197778 A1* | 6/2019 | Sachdeva | G06F 18/251 |
| 2020/0160108 A1* | 5/2020 | Inoshita | G06F 18/40 |

FOREIGN PATENT DOCUMENTS

| | | |
|---|---|---|
| JP | 2006-012069 A | 1/2006 |
| JP | 2006-163608 A | 6/2006 |
| JP | 2006-189915 A | 7/2006 |
| JP | 2007-280325 A | 10/2007 |
| JP | 2009-032273 A | 2/2009 |
| JP | 2010-039795 A | 2/2010 |
| JP | 2014-041436 A | 3/2014 |
| JP | 2014-059729 A | 4/2014 |

OTHER PUBLICATIONS

Written Opinion of PCT/JP2016/001453 dated May 24, 2016 [PCT/ISA/237].
Japanese Office Action for JP Application No. 2017-506093 mailed on Dec. 8, 2020 with English Translation.
Japanese Office Action for JP Application No. 2017-506093 mailed on May 25, 2021 with English Translation.
JP Office Action for JP Application No. 2021-102951, mailed on Jul. 19, 2022 with English Translation.

* cited by examiner

Fig. 3

| FRAME NO. | DETECTION RESULT | | CORRECTED CLASS |
|---|---|---|---|
| | PARTIAL REGION | CLASS | |
| 001 | (x1,y1),(x2,y2) | CLASS 2 | — |
| | (x3,y3),(x4,y4) | CLASS 1 | — |
| | (x5,y5),(x6,y6) | CLASS 1 | — |
| 002 | (x7,y7),(x8,y8) | CLASS 2 | — |
| | (x9,y9),(x10,y10) | CLASS 1 | — |
| | (x5,y5),(x6,y6) | CLASS 2 | — |
| 003 | (x11,y11),(x12,y12) | CLASS 2 | — |
| | (x13,y13),(x14,y14) | CLASS 1 | — |
| | (x5,y5),(x6,y6) | CLASS 1 | — |

| NO. | CLASS 0 | INCREMENTED CLASS | |
|---|---|---|---|
| 1-1 | LEFT CLICK | DOUBLE CLICK | MOUSE GESTURE |
| 1-2 | LEFT CLICK | DRAG AND DROP | |
| 1-3 | FLICK | SWIPE | TOUCH GESTURE |
| 1-4 | FLICK LEFT | FLICK RIGHT | |
| 1-5 | PINCH IN | PINCH OUT | |
| 1-6 | TAP | DOUBLE TAP | |

Fig. 8

| NO. | CLASS 0 | CLASS 1 | CLASS 2 | |
|---|---|---|---|---|
| 1-11 | LEFT CLICK | RIGHT CLICK | DOUBLE CLICK | MOUSE GESTURE |
| 1-12 | LEFT CLICK | RIGHT CLICK | DRAG AND DROP | |
| 1-13 | FLICK | TAP | DOUBLE TAP | TOUCH GESTURE |
| 1-14 | FLICK LEFT | FLICK UP | FLICK DOWN | |
| 1-15 | TAP | PINCH IN | PINCH OUT | |

| FRAME NO. | DETECTION RESULT | | CORRECTED CLASS |
| --- | --- | --- | --- |
| | PARTIAL REGION | CLASS | |
| 001 | (x1,y1), (x2,y2) | CLASS 2 | — |
| | (x5,y5), (x6,y6) | CLASS 1 | — |
| ⋮ | ⋮ | ⋮ | ⋮ |

| FRAME NO. | DETECTION RESULT | | CORRECTED CLASS |
| --- | --- | --- | --- |
| | PARTIAL REGION | CLASS | |
| 001 | (x1,y1), (x2,y2) | CLASS 2 | — |
| | (x5,y5), (x6,y6) | CLASS 1 | — |
| | (x3,y3), (x4,y4) | — | CLASS 1 |
| ⋮ | ⋮ | ⋮ | ⋮ |

Fig. 14

| NO. | CLASS 0 | INCREMENTED CLASS | CALCULATION OF PARTIAL REGION OF CLASS 1 | CALCULATION OF PARTIAL REGION OF CLASS 2 | |
|---|---|---|---|---|---|
| 2-1 | LEFT CLICK | DOUBLE CLICK | DRAG AND DROP DOWN-RIGHT | DRAG AND DROP DOWN-LEFT | MOUSE GESTURE |
| 2-2 | LEFT CLICK | RIGHT CLICK | DRAG AND DROP UP-LEFT | DRAG AND DROP UP-RIGHT | |
| 2-3 | LEFT CLICK | RIGHT CLICK | LEFT DOUBLE CLICK | RIGHT DOUBLE CLICK | |
| 2-4 | FLICK | TAP | SWIPE DOWN-RIGHT | SWIPE DOWN-LEFT | |
| 2-5 | FLICK LEFT | FLICK RIGHT | SWIPE DOWN | SWIPE UP | TOUCH GESTURE |
| 2-6 | PINCH IN | PINCH OUT | SWIPE DOWN-RIGHT | SWIPE DOWN-LEFT | |
| 2-7 | TAP | DOUBLE TAP | SWIPE DOWN-RIGHT | SWIPE DOWN-LEFT | |

Fig. 18

| NO. | CLASS 0 | CLASS 1 | CLASS 2 | CALCULATION OF PARTIAL REGION OF CLASS 1 | CALCULATION OF PARTIAL REGION OF CLASS 2 | |
|---|---|---|---|---|---|---|
| 2-11 | LEFT CLICK | RIGHT CLICK | DOUBLE CLICK | DRAG AND DROP DOWN-RIGHT | DRAG AND DROP DOWN-LEFT | MOUSE GESTURE |
| 2-12 | LEFT CLICK | RIGHT CLICK | DOUBLE CLICK | DRAG AND DROP UP-LEFT | DRAG AND DROP UP-RIGHT | |
| 2-13 | FLICK | TAP | DOUBLE TAP | SWIPE DOWN-RIGHT | SWIPE DOWN-LEFT | TOUCH GESTURE |
| 2-14 | FLICK LEFT | FLICK UP | FLICK DOWN | SWIPE DOWN-RIGHT | SWIPE DOWN-LEFT | |
| 2-15 | TAP | PINCH-IN | PINCH-OUT | SWIPE DOWN | SWIPE UP | |

| FRAME NO. | DETECTION RESULT | | CORRECTED CLASS |
| --- | --- | --- | --- |
| | PARTIAL REGION | CLASS | |
| 001 | (x1,y1), (x2,y2) | CLASS 2 | — |
| | (x3,y3), (x4,y4) | CLASS 1 | — |
| | (x5,y5), (x6,y6) | CLASS 1 | — |
| ⋮ | ⋮ | ⋮ | ⋮ |

| FRAME NO. | DETECTION RESULT | | CORRECTED CLASS |
| --- | --- | --- | --- |
| | PARTIAL REGION | CLASS | |
| 001 | (x1,y1), (x2,y2) | CLASS 2 | CLASS 0 |
| | (x3,y3), (x4,y4) | CLASS 1 | — |
| | (x5,y5), (x6,y6) | CLASS 1 | — |
| | (x7,y7), (x8,y8) | — | CLASS 2 |
| ⋮ | ⋮ | ⋮ | ⋮ |

OBJECT DETECTION DEVICE, OBJECT DETECTION METHOD, AND RECORDING MEDIUM

CROSS REFERENCE TO RELATED APPLICATIONS

The present is a continuation application of U.S. patent application Ser. No. 17/752,068 filed on May 24, 2022, which is a continuation application of U.S. patent application Ser. No. 16/938,462 filed on Jul. 24, 2020, which is issued as U.S. Pat. No. 11,373,061, which is a continuation application of U.S. patent application Ser. No. 16/418,456 filed on May 21, 2019, which is issued as U.S. Pat. No. 10,755,143, which is a continuation application of U.S. patent application Ser. No. 15/558,652 filed on Sep. 15, 2017, which is issued as U.S. Pat. No. 10,339,422, which is a National Stage of International Application No. PCT/JP2016/001453 filed on Mar. 15, 2016, which claims the benefit of priority from Japanese Patent Application No. 2015-055926 filed on Mar. 19, 2015, the disclosures of all of which are incorporated in their entirety by reference herein.

TECHNICAL FIELD

The present invention relates to an object detection device and the like that detect an object from an image using dictionaries.

BACKGROUND ART

Devices for detecting an object by analyzing a captured image obtained by using an image capture device have been proposed. PTL 1 discloses a technique for analyzing, in a production process of a substrate such as a printed circuit board, a captured image of the substrate to detect an object such as a scratch on the substrate. PTL 2 discloses a technique for analyzing a road monitoring video obtained by a monitoring camera to detect an object such as a car.

In the techniques disclosed in PTL 1 and PTL 2, an object detection device learns in order to perform detections as described above. For the learning, teacher data (referred to also as training data) is needed. The teacher data is an instance of a pair of an input and an output. The teacher data includes two types that are a positive instance and a negative instance. To cause the object detection device to correctly learn, both a positive instance and a negative instance are needed. However, it takes much time and labor to create appropriate teacher data.

PTL 1 discloses a technique for creating teacher data necessary to detect an object such as a scratch and the like on a substrate. The technique extracts a region having a brightness value different from that of a good article from an image of a printed circuit board, displays the extracted region on a display, and accepts a selection of the region and an input of a class (referred to also as a category) thereof from the user using a keyboard and a mouse. Specifically, the user selects one specific region among a plurality of existing regions by a click of the mouse and then selects a desired class by a click of the mouse from a pull-down menu displayed upon the selection.

PTL 2 discloses a technique for creating teacher data necessary to detect an object such as a car and the like running on the road. The technique cuts out a region of an object from an optional captured image using a dictionary, extracts a predetermined feature amount from the region, and learns the dictionary on the basis of the extracted feature amount. This series of operations are automatically performed.

CITATION LIST

Patent Literature

[PTL 1] Japanese Patent Application Laid-open No. 2003-317082
[PTL 2] Japanese Patent Application Laid-open No. 2014-59729

Technical Problem

Solution to Problem

However, the operability is compromised in the technique disclosed in PTL 1, since a user needs to perform separate operational steps, on the input device, of selecting an area to be used for creating teacher data and inputting a class corresponding to this selected area.

Whereas, teacher data can be efficiently created in the technique disclosed in PTL 2, due to the automatic operation of cutting out object regions, extracting feature amounts from the regions, and learning a dictionary on the basis of the extracted feature amounts. However, the object regions cut out using a dictionary and the corresponding classes are not always correct, thus, the quality of teacher data is degraded.

The objective of the present invention is to solve the above-described problems, that is, to provide an object detection device and the like that efficiently creates good-quality teacher data.

Solution to Problem

To solve the problems described above, a first aspect of the present invention is an object detection device. The device includes:
  a detecting unit that detects an object from an input image by referring to a dictionary;
  an accepting unit that displays, on a display device, the input image with indication that emphasizes a partial region of the detected object and accepting a selection of the partial region and an input of a class for the selected partial region through one operation of an input device;
  a generating unit that generates teacher data from an image of the selected partial region and the input class; and
  a learning unit that learns the dictionary based on the teacher data.

A second aspect of the present invention is an object detecting method. The method includes:
  detecting an object from an input image by referring to a dictionary;
  displaying, on a display device, the input image with indication that emphasizes a partial region of the detected object;
  accepting a selection of the partial region and an input of a class for the selected partial region through one operation of an input device;
  generating teacher data from an image of the selected partial region and the input class; and
  learning the dictionary based on the teacher data.

A third aspect of the present invention is a recording medium that stores a program for causing a computer to implement functions as:
- a detecting unit that detects an object from an input image by referring to a dictionary;
- an accepting unit that displays, on a display device, the input image with indication that emphasizes a partial region of the detected object and accepting a selection of the partial region and an input of a class for the selected partial region through one operation of an input device;
- a generating unit that generates teacher data from an image of the selected partial region and the input class; and
- a learning unit that learns the dictionary based on the teacher data.

Advantageous Effects of Invention

With the above-described configuration, the present invention can efficiently create good-quality teacher data.

BRIEF DESCRIPTION OF DRAWINGS

FIG. 3 is a diagram illustrating one example of a detection result of the objects in the first example embodiment of the present invention;

FIG. 7 is a diagram illustrating an example of a combination of gesture types in a modified example of the first example embodiment of the present invention;

FIG. 8 is a diagram illustrating an example of a combination of gesture types in the modified example of the first example embodiment of the present invention;

FIG. 12A is a diagram illustrating a pre-update example of a detection result obtained by the accepting unit of the object detection device according to the second example embodiment of the present invention;

FIG. 12B a diagram illustrating a post-update example of the detection result obtained by the accepting unit of the object detection device according to the second example embodiment of the present invention;

FIG. 14 is a diagram illustrating an example of a combination of gesture types in a modified example of the second example embodiment of the present invention;

FIG. 18 is a diagram illustrating an example of a combination of gesture types in the modified example of the second example embodiment of the present invention;

FIG. 23A is a diagram illustrating a pre-update example of a detection result obtained by the accepting unit of the object detection device according to the fourth example embodiment of the present invention;

FIG. 23B is a diagram illustrating a post-update example of the detection result obtained by the accepting unit of the object detection device according to the fourth example embodiment of the present invention;

DESCRIPTION OF EMBODIMENTS

Next, a detailed explanation will be given for example embodiments of the present invention with reference to the drawings. In the following description of the drawings, identical or similar portions will be assigned with identical or similar reference signs. However, the drawings schematically illustrate the configuration of the example embodiment of the present invention. Further, the example embodiment of the present invention to be described below is one example and can be appropriately subjected to modifications in a scope in which essences thereof are the same.

First Example Embodiment

Figure 1:
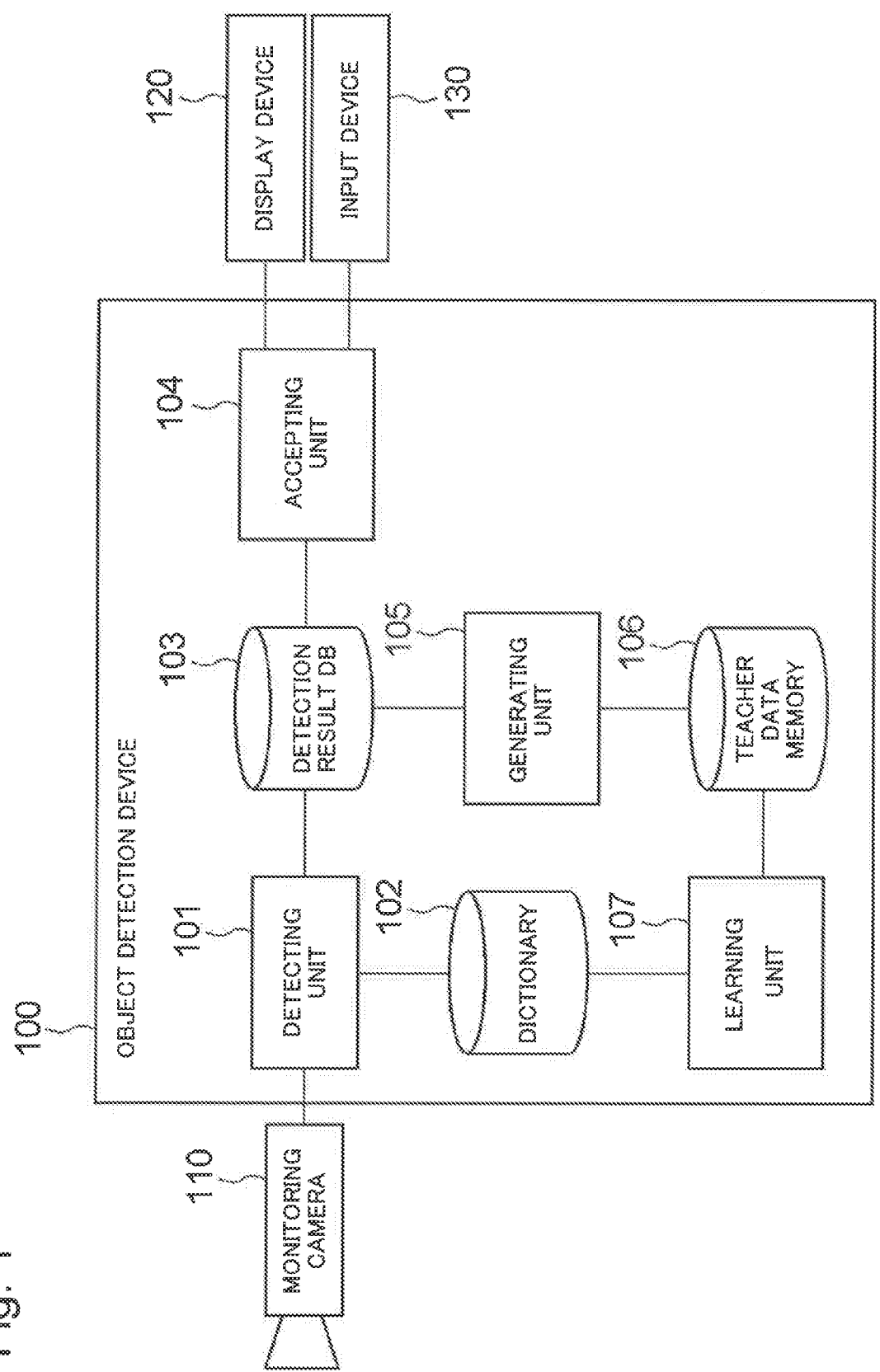
FIG. 1 is a block diagram of an object detection device according to a first example embodiment of the present invention.

Referring to FIG. 1, an object detection device 100 according to a first example embodiment of the present invention has a function of analyzing a monitor video on the road obtained by image capture using a monitoring camera 110 and detecting an object. In the present example embodiment, the object to be detected includes two types of a two-wheeled motor vehicle and a four-wheeled motor vehicle. In other words, the object detection device 100 is a type of multi-class classifier and detects two types of specific objects from an image.

Figure 26:
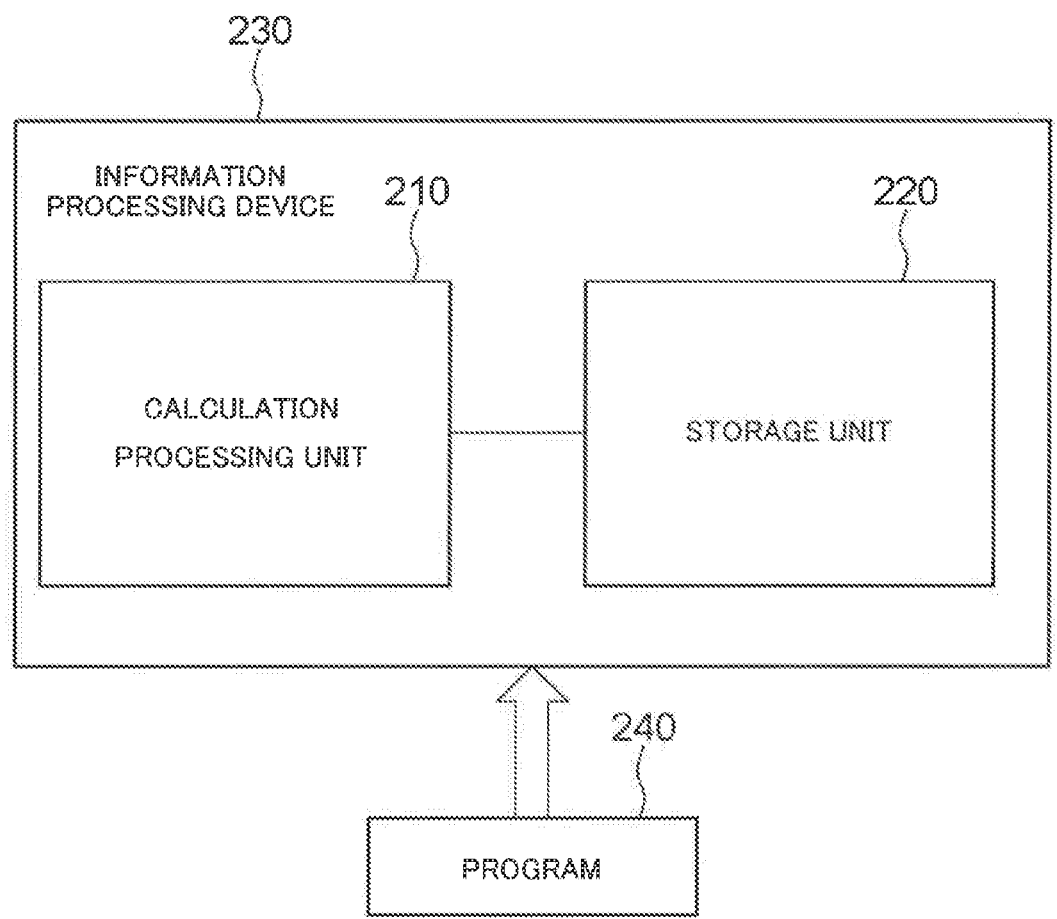
FIG. 26 is a diagram illustrating one example of a hardware configuration of the object detection device according to the first example embodiment of the present invention.

The object detection device 100 includes, as main functional units, a detecting unit 101, a dictionary 102, a detection result DB (detection result database) 103, an accepting unit 104, a generating unit 105, a teacher data memory 106, and a learning unit 107. Further, the object detection device 100 is connected with a display device 120 and an input device 130. The object detection device 100 may include an information processing device 230 and a storage medium that records a program 240, for example, as illustrated in FIG. 26. The information processing device 230 includes a calculation processing unit 210 such as one or more microprocessors or the like and a storage unit 220 such as a semiconductor memory, a hard disk, or the like. The storage unit 220 stores the dictionary 102, the detection result DB 103, the teacher data memory 106, and the like. The program 240 is read in a memory from an external computer-readable recording medium upon a startup or the like of the object detection device 100 and realizes functional means that are the detecting unit 101, the accepting unit 104, the generating unit 105, and the learning unit 107 on the calculation processing unit 210 by controlling an operation of the calculation processing unit 210.

The display device 120 includes a screen display device such as an LCD (Liquid Crystal Display), a PDP (Plasma Display Panel), or the like and has a function of screen-displaying various types of information such as a detection result and the like in accordance with an instruction from the object detection device 100.

The input device 130 is an operation input device such as a keyboard, a mouse, a similar device. The input device 130 detects an operation of the operator as an input and outputs the detected input to the object detection device 100. In the present example embodiment, as the input device 130, a mouse is used. Further, the used mouse is assumed to be able to perform two types of mouse gestures including a left click and a right click.

The detecting unit 101 inputs, one by one in chronological order, images obtained by using the monitoring camera 110 and detects objects from each input image by referring to the dictionary 102. The detecting unit 101 has a function of storing a detection result on the detection result DB 103. The one image refers to a one-frame image captured by the monitoring camera 110. Continuous frame numbers for frame identification are assigned to a series of frames output from the monitoring camera 110.

Figure 2:
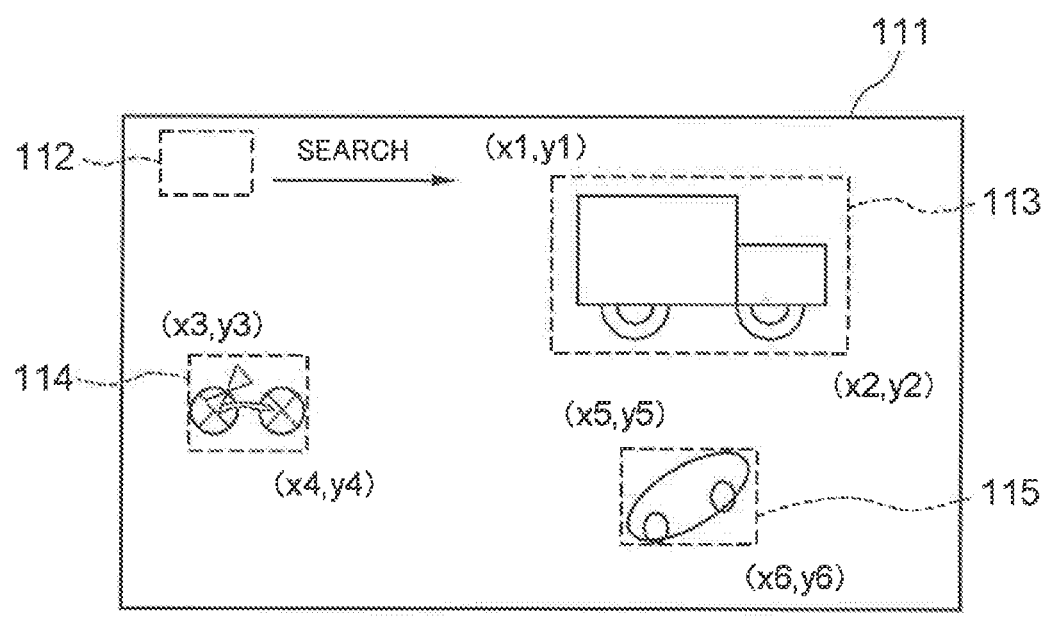
FIG. 2 is an illustrative diagram of a concept for detecting objects from an image in the first example embodiment of the present invention.

FIG. 2 is an illustrative diagram of a concept for detecting objects from an image. The detecting unit 101 generates, for an image 111, a search window 112 for object detection and extracts a feature amount of an image in the search window 112. Further, the detecting unit 101 calculates a likelihood indicating similarity between the extracted feature amount and the dictionary 102 and detects an object by determining whether the image in the search window 112 is the object on the basis of the calculated likelihood. When detecting the object, the detecting unit 101 stores, in relation to identification information of the image 111, a detection result including both information of a partial region in which the object has been detected and a class to be described later, on the detection result DB 103. As the information of a partial region of an object, the location information of a search window 112 for determining the object is used. The location information represents where the search window 112 is located on the image 111. When the search window 112 is rectangular, for example, coordinate values of upper-left and lower-right vertexes of the rectangular are used for the location information. Further, with respect to the class relating to the object, there are three classes in total including class 1 indicating a class for a two-wheeled motor vehicle, class 2 indicating a class for a four-wheeled motor vehicle, and class 0 indicating a class assigned to neither thereof (a class assigned to others). Further, the identification information of the image 111 is, for example, a frame number of an image.

The detecting unit 101 changes a location and a size of the search window 112 and repeats operation similar to such operation as described above to thoroughly search objects with different locations and sizes in the image 111. In the example illustrated in FIG. 2, three objects are detected from the image 111. The detecting unit 101 detects a first object using a search window of a location and a size indicated by a reference sign 113, detects a second object using a search window of a location and a size indicated by a reference sign 114, and detects a third object using a search window of a location and a size indicated by a reference sign 115. In FIG. 2, a horizontal direction and a vertical direction of an image were designated as the X axis and the Y axis, respectively. When finishing detection processing for one image 111, the detecting unit 101 repeats the similar processing for a next image.

FIG. 3 illustrates an example of the detection result DB 103. The detection result DB 103 of this example records a detection result correspondingly to a frame number. The detection result includes information of a partial region of an object and a class. The detection result DB 103 records, for example, a pair of information of a partial region of an object and a class for three objects correspondingly to a frame number 001. One thereof is a pair of a partial region in which coordinates of the upper-left vertex are (x1,y1) and coordinates of the lower-right vertex are (x2,y2) and the class 2, and another one is a pair of a partial region in which coordinates of the upper-left vertex are (x3,y3) and coordinates of the lower-right vertex are (x4,y4) and the class 1. The remaining one is a pair of a partial region in which coordinates of the upper-left vertex are (x5,y5) and coordinates of the lower-right vertex are (x6,y6) and the class 1.

Further, the detection result DB 103 illustrated in FIG. 3 includes a column that records a corrected class for each detection result. The corrected class is equivalent to a class input by the accepting unit 104. At the time when the detecting unit 101 outputs a detection result to the detection result DB 103, every corrected class column indicates NULL (indicated as - in FIG. 3).

The accepting unit 104 displays, through visualization, a detection result of an image stored on the detection result DB 103 on the display device 120 and accepts an input of a correction from the operator.

Figure 4:
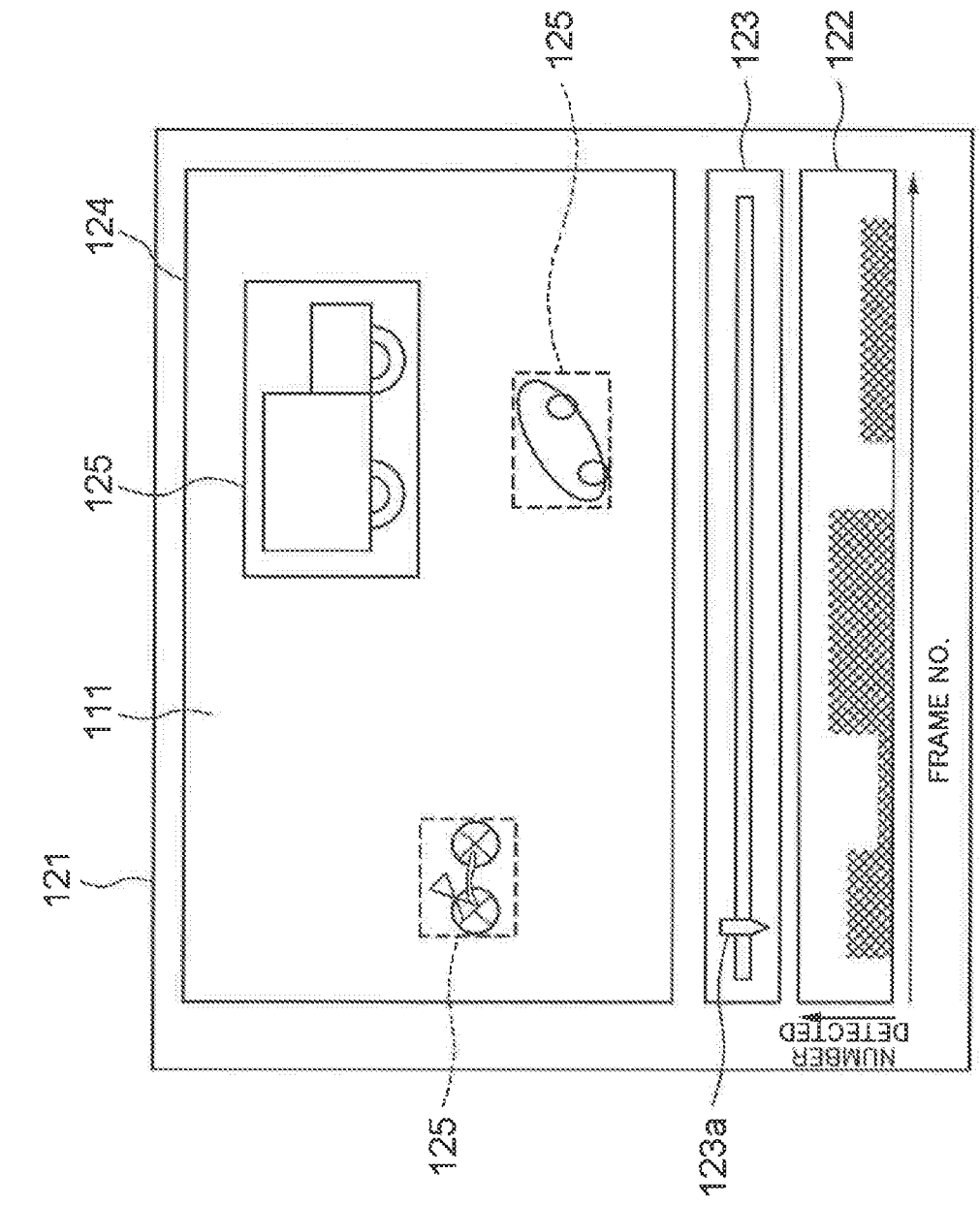
FIG. 4 is a diagram illustrating one example of an acceptance screen in the first example embodiment of the present invention.

FIG. 4 illustrates one example of an acceptance screen 121 displayed on the display device 120 by the accepting unit 104. In this example, the acceptance screen 121 displays a graph 122 at the bottom of the screen, displays a slider 123 in an upper portion thereof, and further displays an image window 124 at the top.

The graph 122 is a graph indicating a relation between a plurality of images including the image 111 and the number of partial regions in which objects are detected in each screen. When a horizontal direction and a vertical direction of the acceptance screen 121 are designated as the X axis and the Y axis, respectively, the X axis of the graph 122 indicates a frame number of an image and the Y axis thereof indicates the number of partial regions in which objects are detected, i.e. the number of detected objects. In other words, the accepting unit 104 designates a sequence in which input images corresponding to detection results stored on the detection result DB 103 are disposed in ascending or descending order of frame numbers as the X axis of the graph 122. However, the X axis may be one other than a sequence in which input images are disposed in ascending or descending order of frame numbers. The X axis may be, for example, a sequence in which input images are disposed on the basis of the numbers of partial regions of objects (i.e. the number of detected objects). In this case, the accepting unit 104 sorts input images of a detection result 103 stored on the detection result DB 103 in ascending or descending order on the basis of the number of detected objects and designates a sequence of the sorted input images as the X axis of the graph 122. Further, in FIG. 4, the graph 122 is a bar chart, but the type of the graph 122 may be another type such as a line chart or the like without limitation to the bar chart.

The slider 123 is a GUI (Graphical User Interface) to select a location on the X axis of the graph 122, i.e. an image. The slider 123 includes a slide bar 123a and selects a location on the X axis of the graph 122 when the slide bar 123a is operated from side to side by the input device 130.

The image window 124 displays, on a frame unit basis, one image 111 selected by an operation of the slider 123 among a plurality of images. The image 111 displayed on the image window 124 has indication that emphasizes a partial region of a detected object. In the example of FIG. 4, a rectangular frame 125 indicating an outer circumference of a partial region of an object is displayed. However, the indication that emphasizes a partial region of an object is not limited to the rectangular frame 125, and usable is an optional display form such as a display form that increases or decreases a brightness of the entire partial region compared with that of another region, a display form that displays shading over the entire partial region, or the like.

Further, in the indication that emphasizes a partial region of a detected object, indication is performed in a different display form, depending on a class of the detected object. In FIG. 4, a partial region of an object of the class 1 is displayed by a dashed-line frame 125, and a partial region of an object of the class 2 is displayed by a solid-line frame 125. A display color of the frame 125 may be allowed to differ instead of allowing the line type of the frame 125 to differ. Further, a numerical value indicating a class may be displayed in the vicinity of a partial image.

In general, in a slider of a GUI, a scale and a label that are a guide for an operation of the operator are displayed. The acceptance screen 121 illustrated in FIG. 4 displays the graph 122 indicating the number of detected objects for each image, instead of the scale and the label. When such a graph 122 is displayed, the operator can easily select one image from a plurality of images on the basis of the number of detected objects.

Further, the accepting unit 104 has a function of accepting a selection of a partial region and an input of a class for the selected partial region by an operation of the input device 130 for the image 111 displayed on the display device 120. The accepting unit 104 accepts the selection of the partial region on the basis of a location on the image 111 subjected to the operation of the input device 130 and accepts the input of the class on the basis of the type of the operation. In the present example embodiment, the input device 130 is a mouse, and the type of the operation includes a left click and a right click. The left click refers to an operation in which the left button of the mouse is single-clicked. Further, the right click refers to an operation in which the right button of the mouse is single-clicked. The accepting unit 104 accepts a selection of a partial region that includes, in the region, a location on the image 111 left-clicked or right-clicked. Further, the accepting unit 104 accepts an input of the class 0 upon a left click for the selected partial region and accepts, upon a right click, an input of a class obtained by incrementing the current class. The class obtained by incrementing the current class refers to the class 2 when the current class is the class 1, the class 0 when the current class is the class 2, and the class 1 when the current class is the class 0. The accepting unit 104 records the accepted class in the corrected class column of the detection result DB 103 for the selected partial region.

The generating unit 105 generates teacher data from an image of the partial region selected by the accepting unit 104 and the input class and stores the generated data on the teacher data memory 106. The generating unit 105 generates teacher data for each partial region in which any one of the class 0, the class 1, and the class 2 is recorded, in the corrected class column in the detection result DB 103 illustrated in FIG. 3. It is assumed that in the teacher data, an image of a partial region thereof or a feature amount extracted from the image of the partial region and a class recorded in the corrected class column are designated as an input/output pair.

The learning unit 107 learns the dictionary 102 based on teacher data stored on the teacher data memory 106. A technique for learning the dictionary 102 based on teacher data is widely known, and therefore description thereof will be omitted. The dictionary 102 is upgraded by learning based on the teacher data. The detecting unit 101 refers to the upgraded dictionary 102 to detect objects from each image input again from the monitoring camera 110.

Figure 5:
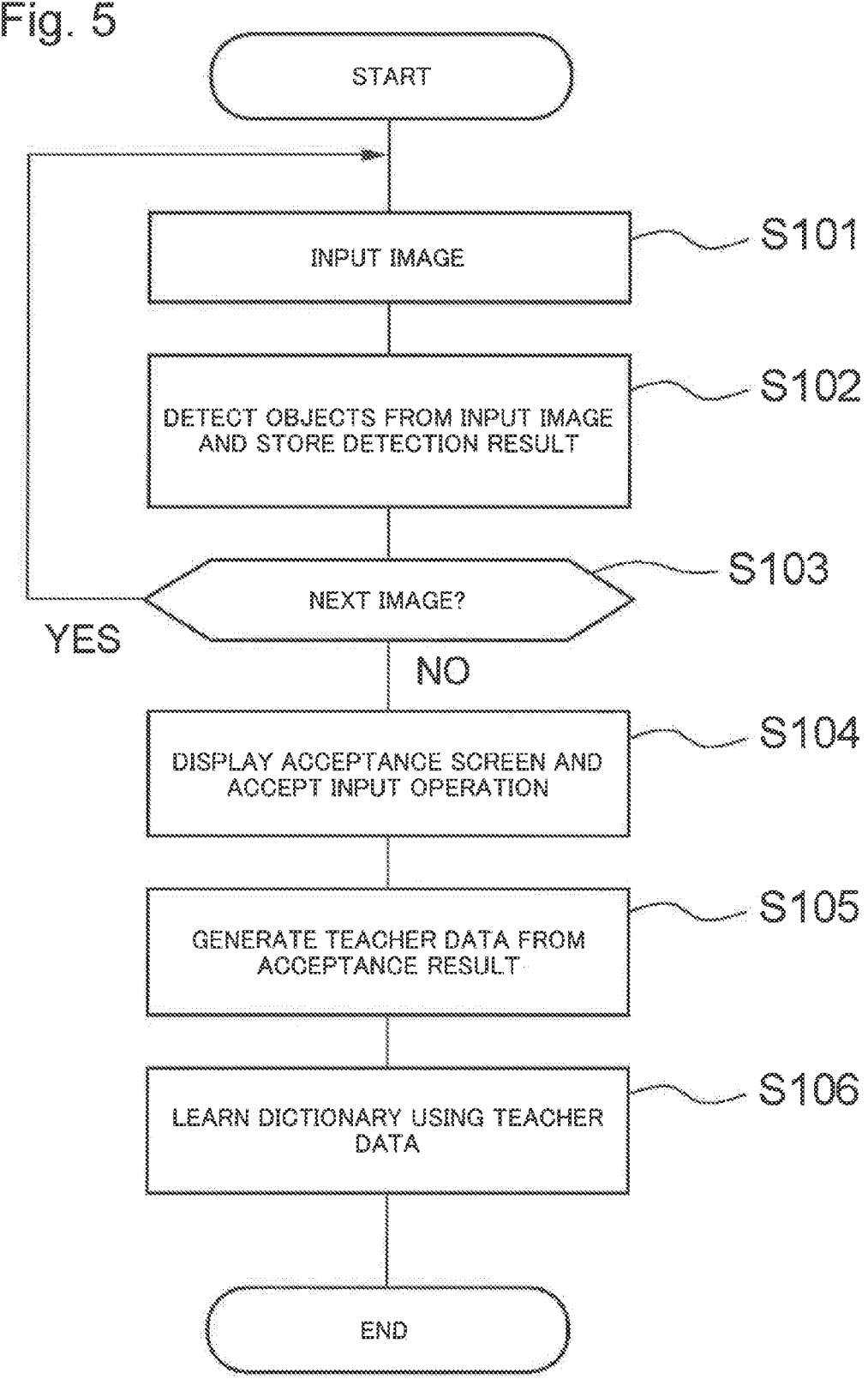
FIG. 5 is a flowchart illustrating one example of an operation of the object detection device according to the first example embodiment of the present invention.

FIG. 5 is a flowchart illustrating an operation of the present example embodiment. The operation of the present example embodiment will be described below with reference to FIG. 5.

The detecting unit 101 of the object detection device 100 inputs, one by one in chronological order, images obtained by using the monitoring camera 110 (step S101). The detecting unit 101 detects, on the basis of a technique as described with reference to FIG. 2, objects from the input image by referring to the dictionary 102 and stores a detection result on the detection result DB 103 (step S102). When a next image is obtained by image capture using the monitoring camera 110 (step S103), the detecting unit 101 returns to step S100 and repeats the processing similar to the processing described above. Thus, detection results of a plurality of images as illustrated in FIG. 3 are accumulated on the detection result DB 103. When processing of the detecting unit 101 for a series of images captured by the monitoring camera 110 is terminated, processing executed by the accepting unit 104 is started.

The accepting unit 104 displays an acceptance screen 121 as illustrated in FIG. 4 on the display device 120 and accepts an input operation of an input device (step S104). Details of step S104 will be described later.

When the acceptance by the accepting unit 104 is terminated, the generating unit 105 generates teacher data from an image of a partial region selected by the accepting unit 104 and an input class (step S105). The learning unit 107 learns the dictionary 102 based on teacher data stored on the teacher data memory 106 (step S106).

Figure 6:
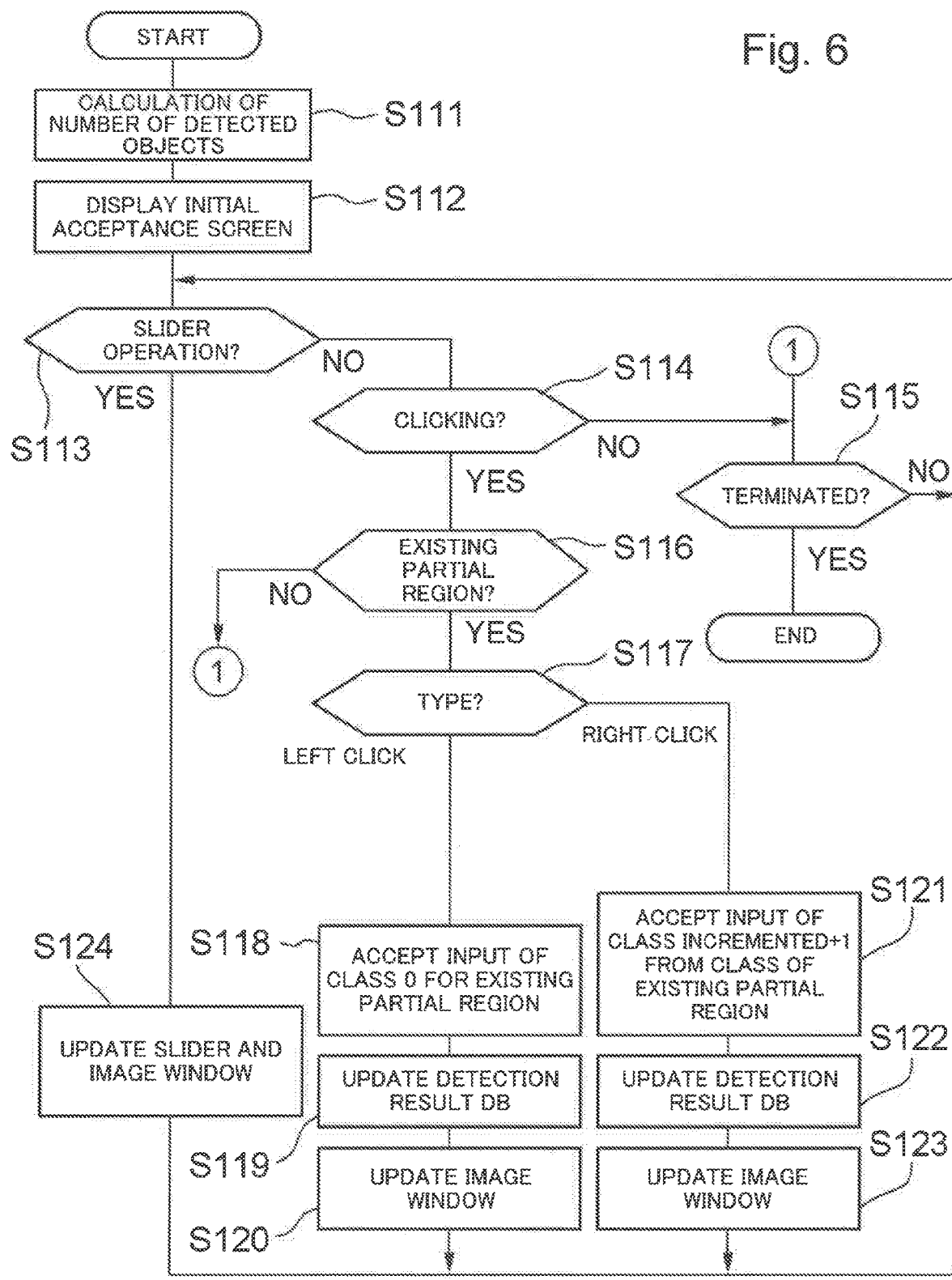
FIG. 6 is a flowchart illustrating details of an operation of an accepting unit of the object detection device according to the first example embodiment of the present invention.

FIG. 6 is a flowchart illustrating details of the operation of the accepting unit 104 performed in step S104. Hereinafter, the details of the operation of the accepting unit 104 will be described with reference to FIG. 6.

The accepting unit 104 calculates the number of detected objects for each image from the detection result DB 103 (step S111). Referring to FIG. 3, three partial regions have been detected from an image of a frame number 001, and therefore the accepting unit 104 assigns the number of detected objects of the frame number 001 as 3. In the same manner, the accepting unit 104 calculates the number of detected objects of an image of another frame number.

The accepting unit 104 displays an initial acceptance screen 121 on the display device 120 (step S112). The initial acceptance screen 121 displays, as illustrated in FIG. 4, the graph 122, the slider 123, and the image window 124. The graph 122 displays the number of detected objects for each frame number calculated in step S111. The slider 123 is equipped with the slide bar 123*a* disposed at a predetermined location. The image window 124 displays an image of the number of objects on the X axis of the graph 122 indicated by the slide bar 123*a*. Further, a partial region of an object detected on an image displayed on the image window 124 is emphasized by a frame 125 of a line type in accordance with a class of the partial region.

The accepting unit 104 determines whether the slide bar 123*a* of the slider 123 has been operated (step S113), whether a click has been performed for an image on the image window (step S114), and whether an acceptance termination condition has been established (step S115). The acceptance termination conditions may include, for example, input of an acceptance termination command by an operator or absence of input operation over a certain period of time.

When detecting a left click or a right click for the image of the image window 124 (YES in step S114), the accepting unit 104 determines whether there is a partial region including the clicked location in the image (step S116). This determination is performed by examining whether coordinate values of the clicked location fall within any one of partial regions of the image being displayed on the image window 124. When there is no partial region including the clicked location (NO in step S116), the accepting unit 104 neglects the click. On the other hand, when there is a partial region including the clicked location (YES in step S116), the accepting unit 104 determines that the partial region including the clicked location has been selected and then determines, in order to determine an input of a class, which one of a left click and a right click the type of the click is (step S117).

In the case of the left click, the accepting unit 104 accepts an input of the class 0 for the selected partial region (step S118). The accepting unit 104 updates a corrected class corresponding to the selected partial region of the detection result in the detection result DB 103 to the accepted class 0 (step S119). The accepting unit 104 hides the frame 125 having been displayed for the selected partial region of the image displayed on the image window 124 (step S120).

Further, in the case of the right click, the accepting unit 104 accepts an input of a class obtained by incrementing the current class of the selected partial region (step S121). The current class of the selected partial region is, when the corrected class corresponding to the selected partial region of the detection result in the detection result DB 103 is NULL, a class of the detection result and is, when the corrected class is not NULL, a class described as the corrected class. The accepting unit 104 updates the corrected class corresponding to the selected partial region of the detection result in the detection result DB 103 to the incremented class (step S122). The accepting unit 104 updates the display of the frame 125 having been displayed for the selected partial region of the image displayed on the image window 124 (step S123). Specifically, when the incremented class is the class 2, the accepting unit 104 displays the frame 125 with a solid line. Further, when the incremented class is the class 0, the accepting unit 104 hides the frame 125. Further, when the incremented class is the class 1, the accepting unit 104 displays the frame 125 with a dashed line.

On the other hand, when detecting that the slide bar 123*a* has been operated (step S113), the accepting unit 104 updates the slide bar 123*a* of the acceptance screen 121 and the image of the image window 124 (step S124). Specifically, the accepting unit 104 moves a display location of the slide bar 123*a* in accordance with an input operation. Further, the accepting unit 104 displays, on the image window 124, an image of the number of objects on the X axis of the graph 122 indicated by the slide bar 123*a* after the movement.

Further, the accepting unit 104 determines whether a partial region on the image displayed on the image window 124 has the same location and the same pre-input class as a partial region of an image for which a class was input in the past. When it is determined that the partial region has the same location and the same pre-input class, the accepting unit 104 hides the frame 125 that emphasizes the partial region. For example, with regard to the third partial regions of frame numbers 001, 002, 003 in FIG. 3, the rectangular partial regions each have the upper-left vertex at (x5, y5) and the lower-right vertex at (x6, y6), thus, the locations thereof are the same. In addition, the classes are also the same class 1. Therefore, when, for example, a class of the third partial image is corrected from the class 1 to the class 0 for an image of the frame number 001 and thereafter images of the frame numbers 002 and 003 are displayed on the image window 124, the frame 125 is not displayed for the third partial images of the images of the frame numbers 002 and 003. However, as the classes of these detection results, the class 1 remains recorded.

In this manner, according to the present example embodiment, good-quality teacher data can be efficiently created. The reason is that the accepting unit 104 displays, on the display device 120, an input image with indication that emphasizes a partial region of a detected object and accepts a selection of a partial region and an input of a class for the selected partial region by a click that is one operation of the input device 130.

Further, according to the present example embodiment, one image can be easily selected from a plurality of images on the basis of the number of detected objects. This is because the accepting unit 104 displays, on the display device 120, a graph 122 indicating a relation between an input image and the number of partial regions where objects are detected and, in accordance with a location on the graph 122 accepted through operation of the slider 123, selects an input image for which a detection result is displayed on the display device 120. The present example embodiment makes it possible to select an image to be processed on the basis of the number of detected objects. Therefore, according to the extent of a skill and the preference of the operator, processing can be executed on a priority basis from an image in which a large number of objects are detected. In cases contrary thereto, the present example embodiment makes it possible to easily execute processing on a priority basis from an image in which the number of detected objects is small or to easily execute on a priority basis from an image in which the number of detected objects is at an intermediate level thereof. In general, processing on a priority basis from an image in which a large number of objects are detected shortens a total working time. However, with an image in which a large number of partial regions are overlapped with each other, is it not easy for an inexperienced operator to figure the number of partial regions.

Further, in general, when the monitoring camera 110 having a fixed visual field captures, at certain periods, an image of a two-wheeled motor vehicle or a four-wheeled motor vehicle running on the road, an unmoving object appears commonly at the same location on a plurality of continuous frame images. Therefore, when, for example, a puddle or the like formed on the road is erroneously detected as a two-wheeled motor vehicle, the same misrecognition results appear at the same location on a plurality of continuous frame images. It is sufficient to generate teacher data by correcting any one of the same misrecognition results, and therefore it is actually troublesome that the same one as an already-corrected misrecognition result is displayed with emphasis over a large number of frame images. In the present example embodiment, the accepting unit 104 hides the frame 125 that emphasizes a partial region having the same location and the same pre-input class as a partial region of an image for which a class was input in the past. This makes it possible to eliminate the troublesomeness.

Modified Examples of the First Example Embodiment

Next, various types of modified examples in which the configuration of the first example embodiment is modified will be described.

In the first example embodiment, the accepting unit 104 accepts an input of the class 0 by a left click as a mouse gesture, and an input of a class increment by a right click. However, with respect to a gesture type to accept an input of the class 0 and a gesture type to accept an input of a class increment, various combinations can be formed, as exemplified in the list of FIG. 7.

For example, in No. 1-1 illustrated in FIG. 7, the accepting unit 104 accepts an input of the class 0 by a left click as a mouse gesture and accepts an input of a class increment by a double click. The double click refers to an operation in which the left button of the mouse is single-clicked twice in a row.

Further, in No. 1-2 illustrated in FIG. 7, the accepting unit 104 accepts an input of the class 0 by a left click as a mouse gesture and accepts an input of a class increment by a drag-and-drop. The drag-and-drop refers to an operation in which the mouse is moved (dragged), while the left button of the mouse is being pressed, and the left button is released (dropped) at another location. When the drag-and-drop is used, in step S114 of FIG. 6, it is determined whether a drag-and-drop has been performed on the image window, and in step S116, it is determined whether there is a partial region including, for example, a drag start point and a drop point.

For Nos. 1-1 and 1-2, in the same manner as in the first example embodiment, a mouse gesture is used. In contrast, for Nos. 1-3 to 1-6 illustrated in FIG. 7, a touch gesture is used. The touch gesture refers to a touch operation performed on a touch panel using a part of a human body such as a fingertip or the like. The touch gesture includes a large number of types such as a tap (a lightly-tapping operation with a finger or the like), a double tap (a twice-tapping operation with a finger or the like), a flick (a snapping or sweeping operation with a finger or the like), a swipe (a tracing operation with a finger or the like), a pinch-in (a pinching or nipping operation with a plurality of fingers or the like), and a pinch-out (a widening operation with a plurality of fingers or the like). When a touch gesture is used, as the input device 130, a touch panel is used. The use of the touch panel is useful also when, for example, the present invention is mounted in a mobile device such as a smartphone, a tablet terminal, or the like.

In No. 1-3 of FIG. 7, the accepting unit 104 accepts an input of the class 0 by a flick and accepts an input of a class increment by a swipe. Further, in No. 1-4 of FIG. 7, the accepting unit 104 accepts an input of the class 0 by a left-direction flick and accepts an input of a class increment by a right-direction flick. In No. 1-5 of FIG. 7, the accepting unit 104 accepts an input of the class 0 by a pinch-in and accepts an input of a class increment by a pinch-out. In No. 1-6 of FIG. 7, the accepting unit 104 accepts an input of the class 0 by a tap and accepts an input of a class increment by a double tap. These are illustrative and any combination of other optional gestures is usable.

In the first example embodiment and Nos. 1-1 to 1-6 of FIG. 7, the accepting unit 104 accepted an input of the class 0 by a first-type gesture and accepted an input of a class increment by a second-type gesture. However, the accepting unit 104 may accept an input of a decrement instead of the increment. In other words, in the first example embodiment and Nos. 1-1 to 1-6 of FIG. 7, the accepting unit 104 may accept an input of the class 0 by the first-type gesture and accept an input of a class decrement by the second-type gesture.

In the first example embodiment, an input of the class 0 is accepted by a left click as a mouse gesture and an input of a class increment is accepted by a right click. However, it is possible that a class and an operation are related to each other on a one-on-one basis and an input of the class 0, the class 1, or the class 2 is accepted by one specific operation. In the gesture type for accepting an input of each class, various combinations can be formed as illustrated in the list of FIG. 8.

For example, in No. 1-11 illustrated in FIG. 8, the accepting unit 104 accepts an input of the class 0 by a left click as a mouse gesture, accepts an input of the class 1 by a right click, and accepts an input of the class 2 by a double click. Further, in No. 1-12 illustrated in FIG. 8, the accepting unit 104 accepts inputs of the class 0 and the class 1 by the same mouse gestures as in No. 1-11 and accepts an input of the class 2 by a drag-and-drop. The above descriptions are examples using mouse gestures. In contrast, in No. 1-13 to 1-15 illustrated in FIG. 8, touch gestures are used. For example, in No. 1-13 illustrated in FIG. 8, the accepting unit 104 accepts an input of the class 0 by a flick, accepts an input of the class 1 by a tap, and accepts an input of the class 2 by a double tap. Further, in No. 1-14 illustrated in FIG. 8, the accepting unit 104 accepts an input of the class 0 by a left-direction flick, accepts an input of the class 1 by an upper-direction flick, and accepts an input of the class 2 by a lower-direction flick. Further, in No. 1-15 illustrated in FIG. 8, the accepting unit 104 accepts an input of the class 0 by a tap, accepts an input of the class 1 by a pinch-in, and accepts an input of the class 2 by a pinch-out.

In the first example embodiment, the number of classes was three (the class 0, the class 1, and the class 2), but the first example embodiment is applicable to a two-class object detection device in which the number of classes is two (the class 0 and the class 1) and a multi-class object detection device in which the number of classes is four or more.

Second Example Embodiment

A second example embodiment of the present invention will describe an object detection device in which a selection of a partial region of an object having not been able to be mechanically detected from an input image and an input of a class for the partial region are performed by an operation of an input device for the input image. The present example embodiment is different from the first example embodiment in the function of the accepting unit 104 and is basically similar to the first example embodiment in the others. Hereinafter, FIG. 1 that is the block diagram of the first example embodiment is borrowed to describe in detail a function of an accepting unit 104 preferable for the second example embodiment.

The accepting unit 104 has a function of displaying, through visualization, a detection result DB 103 of an image on the display device 120 and accepting an input of a correction from the operator.

Figure 9:
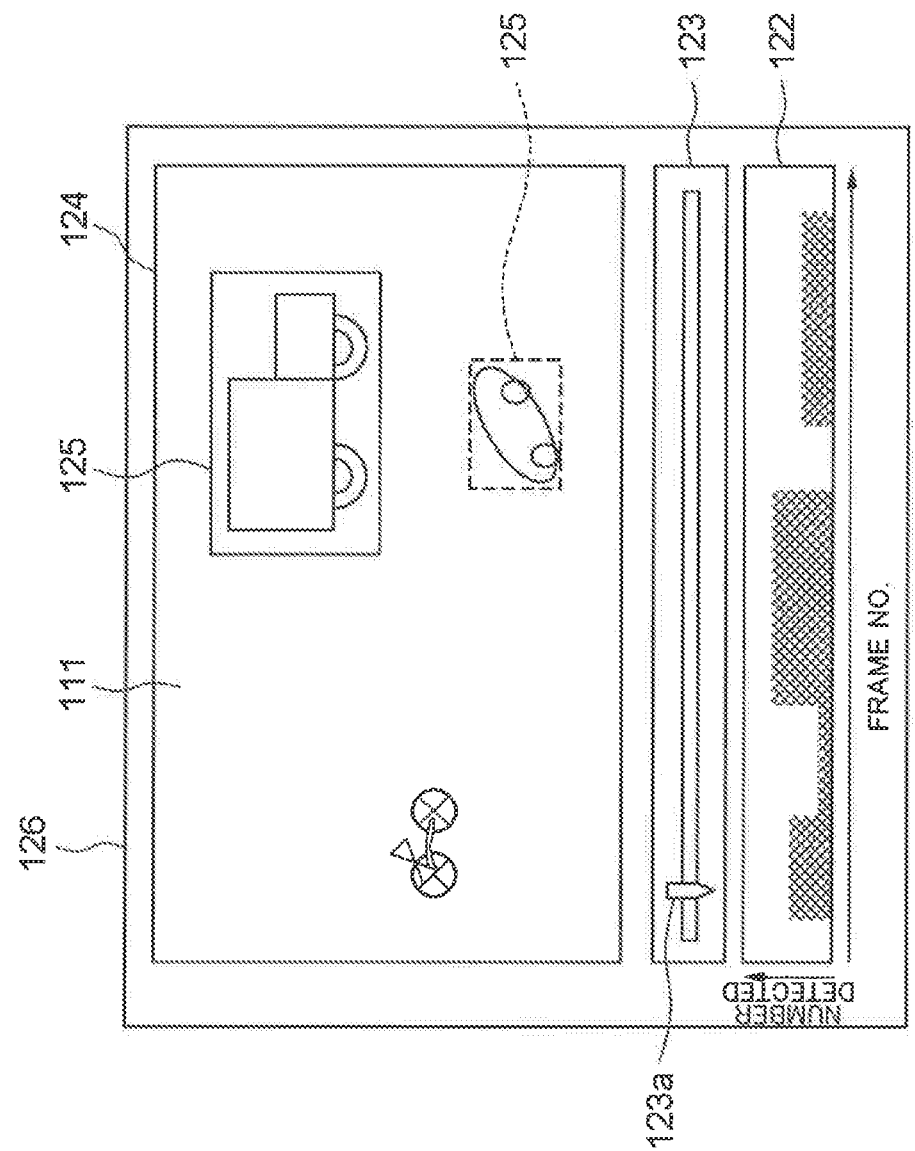
FIG. 9 is a diagram illustrating one example of an acceptance screen in a second example embodiment of the present invention.

FIG. 9 illustrates one example of an acceptance screen 126 displayed on the display device 120 by the accepting unit 104. The acceptance screen 126 of this example is different from the acceptance screen 121 illustrated in FIG. 4 only in a point in which a rectangular frame indicating an outer circumference of a partial region is not displayed for a location of a two-wheeled motor vehicle in an image 111 being displayed on the image window 124. Undisplay of rectangular frame results from a failure in detecting the two-wheeled motor vehicle of the location as an object, when the detecting unit 101 intends to detect the object from the image 111 by referring to the dictionary 102. To improve such a detection failure, the object detection device needs to create teacher data that is an input/output pair of a partial region of the two-wheeled motor vehicle in the image 111 and a class thereof and learn the dictionary 102.

The accepting unit 104 has a function of accepting a selection of a partial region and an input of a class for the selected partial region by an operation of the input device 130 for the image 111 displayed on the display device 120. In the present example embodiment, the selection of a partial region refers to both a selection of an existing partial region and a creation of a new partial region. The accepting unit 104 accepts the selection of the partial region on the basis of a location on the image 111 subjected to the operation of the input device 130 and accepts the input of the class on the basis of the type of the operation. In the present example embodiment, the input device 130 is a mouse and the type of the operation includes a left click, a right click, a lower-right-direction drag-and-drop, and a lower-left-direction drag-and-drop.

Figure 10A:
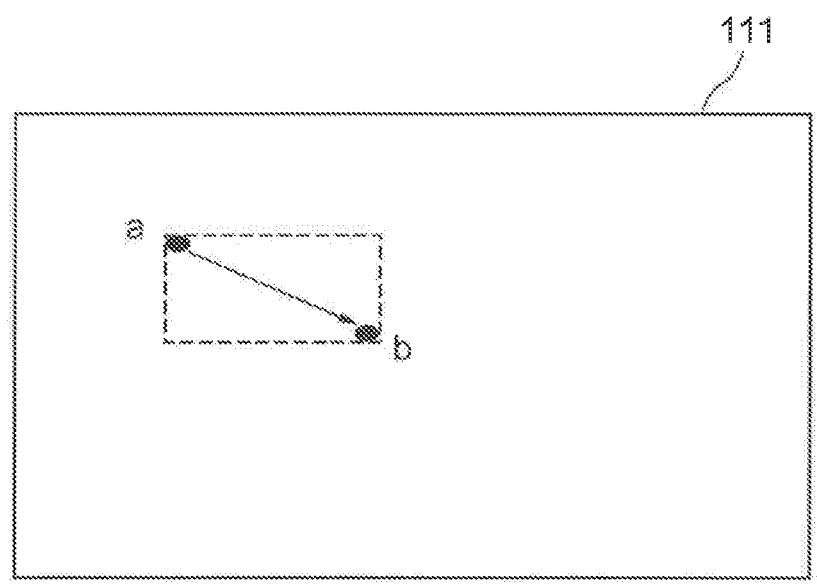
FIG. 10A is a diagram illustrating a meaning of a lower-right-direction drag-and-drop and a calculation example of a partial region used in the second example embodiment of the present invention.

The lower-right-direction drag-and-drop refers to an operation in which as illustrated by the arrow in FIG. 10A, the mouse is moved (dragged) from a certain location (start point) a on the image 111, while the left button of the mouse is being pressed, and the left button is released (dropped) at another location (end point) b existing in a lower-right direction of the start point a. Further, the lower-left-direction drag-and-drop refers to an operation in which as illustrated by the arrow in FIG. 10B, the mouse is moved (dragged) from a certain location (start point) a on the image 111, while the left button of the mouse is being pressed, and the left button is released (dropped) at another location (end point) b existing in a lower-left direction of the start point a.

The accepting unit 104 accepts a selection of a partial region including, in the region, a location on the image 111 left-clicked or right-clicked. Further, for the selected partial region, the accepting unit 104 accepts an input of the class 0 upon the left click and accepts an input of a class obtained by incrementing the current class upon the right click. The class obtained by incrementing the current class refers to the class 2 when the current class is the class 1, the class 0 when the current class is the class 2, and the class 1 when the current class is the class 0. The accepting unit 104 records the accepted class in the corrected class column of the detection result 103 for the selected partial region. The above description is similar to the case in which a left click or a right click is performed in the first example embodiment.

Further, when detecting a lower-right-direction drag-and-drop, the accepting unit 104 calculates, as a partial region, a rectangular region in which a start point a is the upper-left vertex and an end point b is the lower-right vertex as illustrated by the dashed line in FIG. 10A and accepts an input of the class 1 for the partial region. Further, when detecting a lower-left-direction drag-and-drop, the accepting unit 104 calculates, as a partial region, a rectangular region in which a start point a is the upper-right vertex and an end point b is the lower-left vertex as illustrated by the dashed line in FIG. 10B and accepts an input of the class 2 for the partial region. Further, the accepting unit 104 records the newly-calculated partial region and information of a class thereof on the detection result DB 103.

Figure 11:
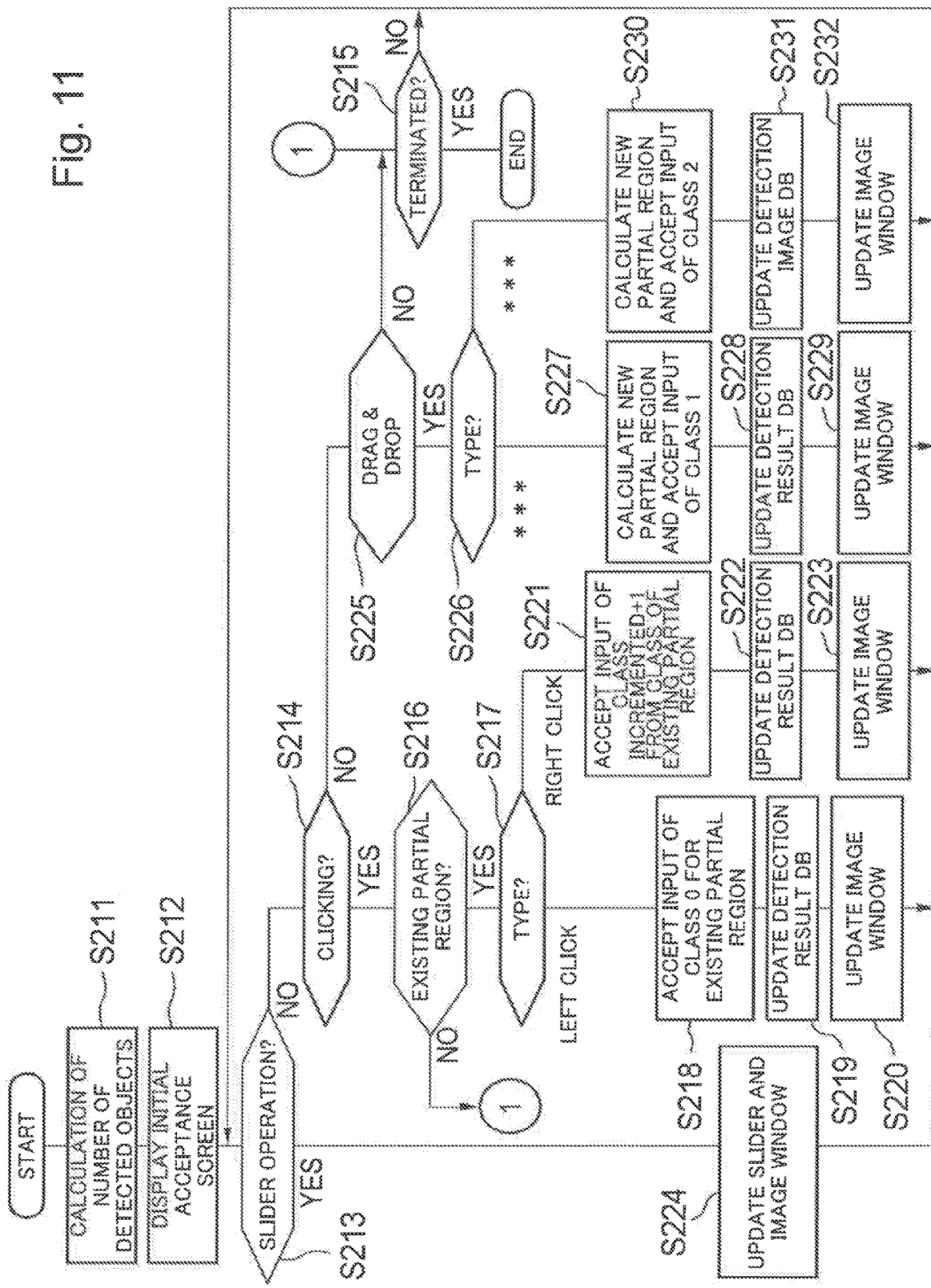
FIG. 11 is a flowchart illustrating details of an operation of an accepting unit of an object detection device according to the second example embodiment of the present invention.

FIG. 11 is a flowchart illustrating details of an operation of the accepting unit 104. In FIG. 11, steps S211 to S224 are the same as steps S111 to S124 of FIG. 6, respectively. Hereinafter, with reference to FIG. 11, the operation of the accepting unit 104 will be described in detail by focusing on differences from FIG. 6.

When detecting a drag-and-drop on an image of the image window 124 (YES in step S225), the accepting unit 104 determines a direction of the drag-and-drop (step S226). In the case of a lower-right-direction drag-and-drop, the accepting unit 104 calculates a rectangular partial region in which a start point is the upper-left vertex and an end point is the lower-right vertex as described with reference to FIG. 10A and accepts an input of the class 1 (step S227). Next, the accepting unit 104 records a pair of the calculated partial region and the class 1 as one detection result on the detection result DB 103 (step S228). Next, the accepting unit 104 updates the image window 124 of the acceptance screen 126 (step S229). Then, the accepting unit 104 returns to processing of step S213.

Figure 10B:
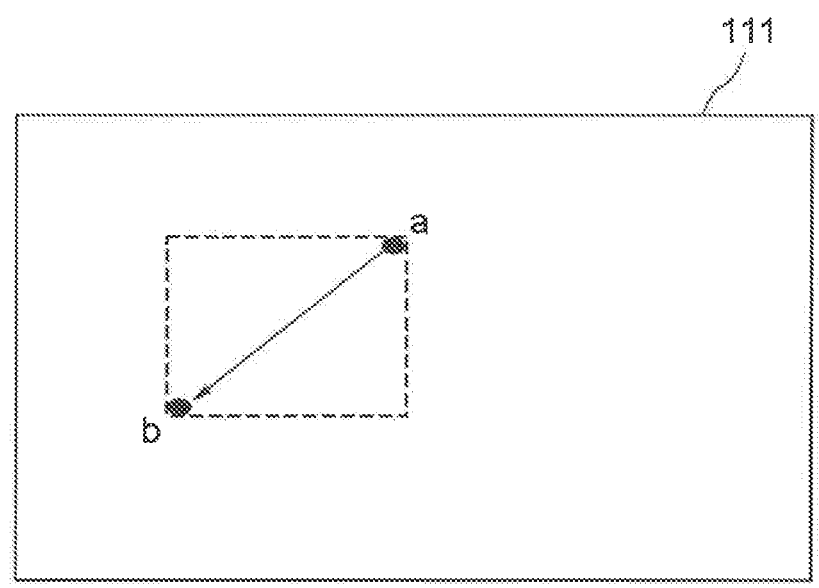
FIG. 10B is a diagram illustrating a meaning of a lower-left-direction drag-and-drop and a calculation example of a partial region used in the second example embodiment of the present invention.

Further, in the case of a lower-left-direction drag-and-drop (step S226), the accepting unit 104 calculates a rectangular partial region in which a start point is the upper-right vertex and an end point is the lower-left vertex as described with reference to FIG. 10B and accepts an input of the class 2 (step S230). Next, the accepting unit 104 records a pair of the calculated partial region and the class 2 as one detection result on the detection result DB 103 (step S231). Next, the accepting unit 104 updates the image window 124 of the acceptance screen 126 (step S232). Then, the accepting unit 104 returns to processing of step S213.

FIG. 12A and FIG. 12B each are an illustrative diagram of step S228 executed by the accepting unit 104. FIG. 12A illustrates a detection result DB 103 generated by the detecting unit 101, and FIG. 12B illustrates a detection result DB 103 obtained after the accepting unit 104 adding a record of a pair of a newly-calculated partial region and the class 1. The newly-added partial region is a rectangle in which the upper-left vertex is (x3,y3) and the lower-right vertex is (x4,y4) and a class thereof is the class 1. In this manner, the class of an added partial region is recorded in the corrected class column. Thus, the generating unit 105 generates teacher data from the added partial region and the class. The case of step S231 executed by the accepting unit 104 differs in a point in which the class 2 is recorded in the corrected class.

Figure 13A:
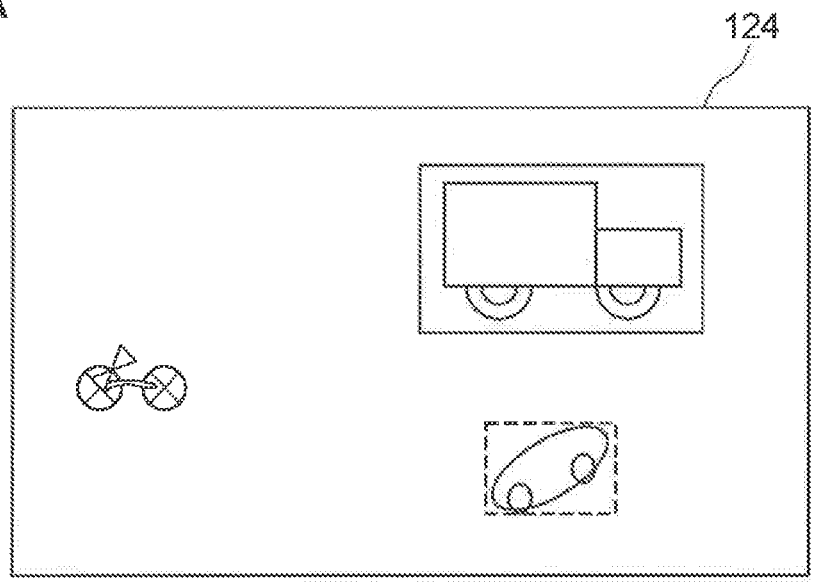
FIG. 13A is a diagram illustrating a pre-update example of an image window obtained by the accepting unit of the object detection device according to the second example embodiment of the present invention.
Figure 13B:
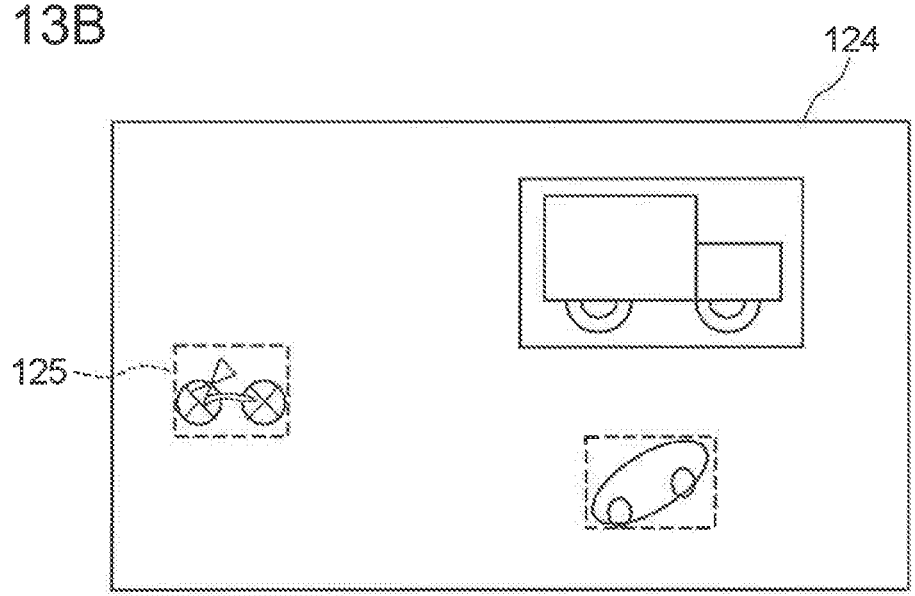
FIG. 13B is a diagram illustrating a post-update example of the image window obtained by the accepting unit of the object detection device according to the second example embodiment of the present invention.

FIG. 13A and FIG. 13B each are an illustrative diagram of step S229 executed by the accepting unit 104. FIG. 13A illustrates a pre-update image window 124, and FIG. 13B illustrates a post-update image window 124. On the post-update image window 124, a rectangular frame 125 with a dashed line that emphasizes a newly-added partial region is drawn. The case of step S232 executed by the accepting unit 104 differs in a point in which a rectangular frame that emphasizes a newly-added partial region is drawn by a solid line on the post-update image window 124.

In this manner, according to the present example embodiment, a good-quality teacher data can be efficiently created. The reason is that the accepting unit 104 displays, on the display device 120, an input image with indication that emphasizes a partial region of a detected object and accepts a selection of a partial region and an input of a class for the selected partial region by a click that is one operation of the input device 130. The reason also includes that the accepting unit 104 detects one operation that is a lower-right-direction or lower-left-direction drag-and-drop on an image and accepts a calculation of a new partial region and an input of the class 1 or the class 2.

Modified Examples of the Second Example Embodiment

Next, various types of modified examples in which the configuration of the second example embodiment of the present invention is modified will be described.

In the second example embodiment, the accepting unit 104 accepted an input of the class 0 by a left click as a mouse gesture, accepted an input of a class increment by a right click, calculated a partial region of the class 1 by a lower-right-direction drag-and-drop, and calculated a partial region of the class 2 by a lower-left-direction drag-and-drop. However, various combinations of gesture types can be formed as exemplified in the list of FIG. 14. The gesture types include a gesture type to accept an input of the class 0, a gesture type to accept an input of a class increment, a gesture type to accept a calculation of a partial region of the class 1, and a gesture type to accept a calculation of a partial region of the class 2.

For example, in No. 2-1 illustrated in FIG. 14, the accepting unit 104 accepts an input of the class 0 by a left click as a mouse gesture and accepts an input of a class increment by a double click. Further, the accepting unit 104 accepts a calculation of a partial region of the class 1 by a lower-right-direction drag-and-drop and accepts a calculation of a partial region of the class 2 by a lower-left-direction drag-and-drop.

Further, in No. 2-2 illustrated in FIG. 14, the accepting unit 104 accepts an input of the class 0 by a left click as a mouse gesture, accepts an input of a class increment by a right click, accepts a calculation of a partial region of the class 1 by an upper-left-direction drag-and-drop, and accepts a calculation of a partial region of the class 2 by an upper-right-direction drag-and-drop. The upper-left-direction drag-and-drop is a drag-and-drop of an opposite direction to the arrow in FIG. 10A and refers to an operation in which while the left button of the mouse is pressed, the mouse is moved (dragged) from a certain location (start point) b on the image 111 and the left button is released (dropped) at another location (end point) a existing in an upper-left direction of the start point b. Further, the upper-right-direction drag-and-drop is a drag-and-drop of an opposite direction to the arrow in FIG. 10B and refers to an operation in which while the left button of the mouse is pressed, the mouse is moved (dragged) from a certain location (start point) b on the image 111 and the left button is released (dropped) at another location (end point) c existing in an upper-right direction of the start point b.

Further, No. 2-3 illustrated in FIG. 14 is different from No. 2-2 in an operation to accept calculations of partial regions of the class 1 and the class 2. In No. 2-3, the accepting unit 104 accepts a calculation of a partial region of the class 1 by a left double click and accepts a calculation of a partial region of the class 2 by a right double click. The left double click means that the left button of the mouse is clicked twice in a row. Further, the right double click means that the right button of the mouse is clicked twice in a row.

Figure 15:
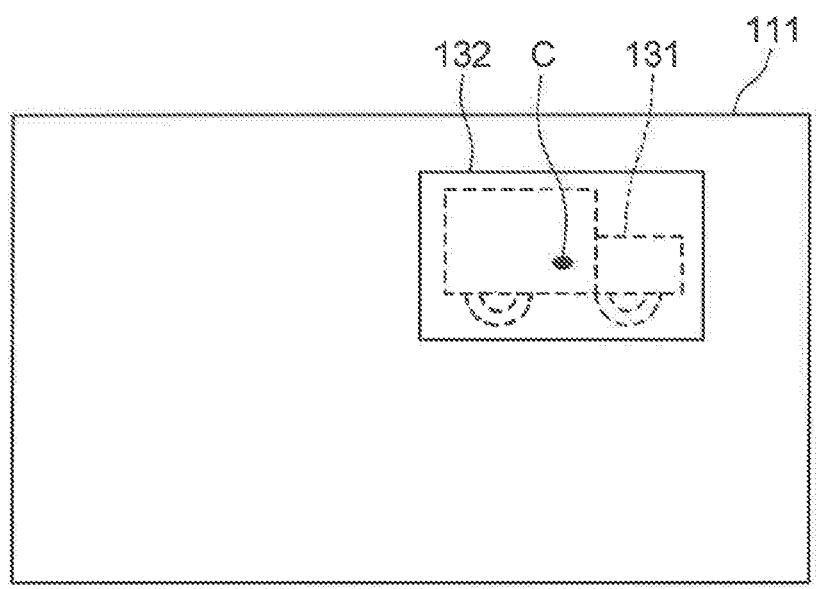
FIG. 15 is an illustrative diagram of a method for calculating a partial region of class 2 from a location where a right double click was performed on an image in the modified example of the second example embodiment of the present invention.

FIG. 15 is an illustrative diagram of a method in which the accepting unit 104 calculates a partial region of the class 2 from a location where a right double click was performed on the image 111. When detecting that a right double click has been performed at a location of a point c on the image 111, the accepting unit 104 assumes that a gravity center of a typical object (a four-wheeled motor vehicle in the present example embodiment) 131 of the class 2 exists at a location coincident with the point c and calculates a circumscribed rectangle 132 of the object as a partial region. When an image of a subject is captured using a monitoring camera 110 having a fixed image-capture visual field, there is a correlation between each point of the subject and each point of the image, and therefore, a circumscribed rectangle of a typical-size object including, as a gravity center, a certain point on an image is substantially uniquely determined.

Further, a circumscribed rectangle of a typical object (a two-wheeled motor vehicle in the present example embodiment) of the class 1 including, as a gravity center, a certain point on an image is substantially uniquely determined. Thus, the accepting unit 104 calculates, in the same manner, a partial region of the class 1 from a location where a left double click was performed on the image 111.

In the example of FIG. 15, a configuration was made in such a manner that the operator right-double-clicked or left-double-clicked a gravity center position of an object via the input device 130, but without limitation to the gravity center position, an arbitrary pre-set position may instead be used. It is possible that, for example, the center of the front wheel in the case of a two-wheeled motor vehicle or an intermediate point between the front wheel and the rear wheel in the case of a four-wheeled motor vehicle is right-double-clicked or left-double-clicked. Further, in the case of an object detection device used for a person as a detection target, a configuration may be made in such a manner that the operator left-double-clicks the head of a person via the input device 130. In this case, the accepting unit 104 estimates a human region from the head location and calculates a circumscribed rectangle of the estimated human region as a partial region.

In Nos. 2-1 to 2-3 described above, mouse gestures are used in the same manner as in the second example embodiment. In contrast, in Nos. 2-4 to 2-7 illustrated in FIG. 14, touch gestures are used as described below.

In No. 2-4 of FIG. 14, the accepting unit 104 accepts an input of the class 0 by a flick, accepts an input of a class increment by a tap, accepts a calculation of a partial region of the class 1 by a lower-right-direction swipe, and accepts a calculation of a partial region of the class 2 by a lower-left-direction swipe.

Figure 16A:
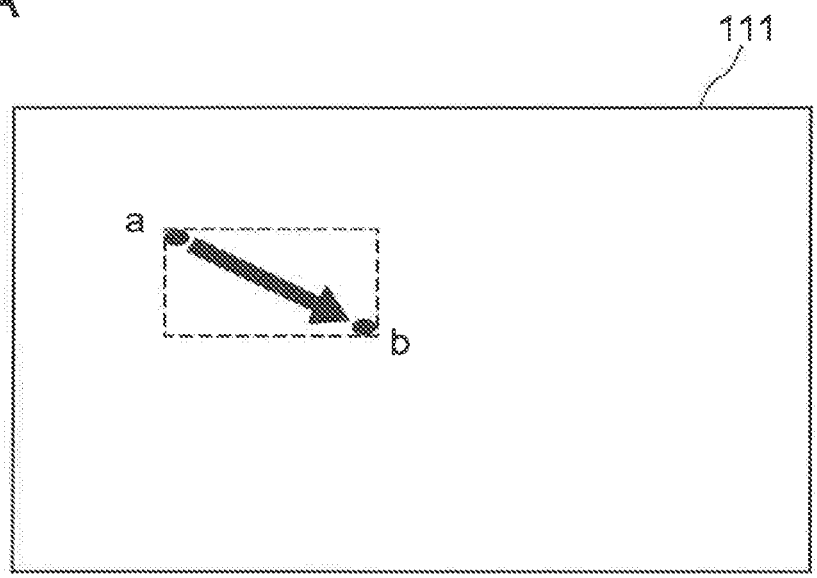
FIG. 16A is a diagram illustrating a meaning of a lower-right-direction swipe and a calculation example of a partial region used in the modified example of the second example embodiment of the present invention.
Figure 16B:
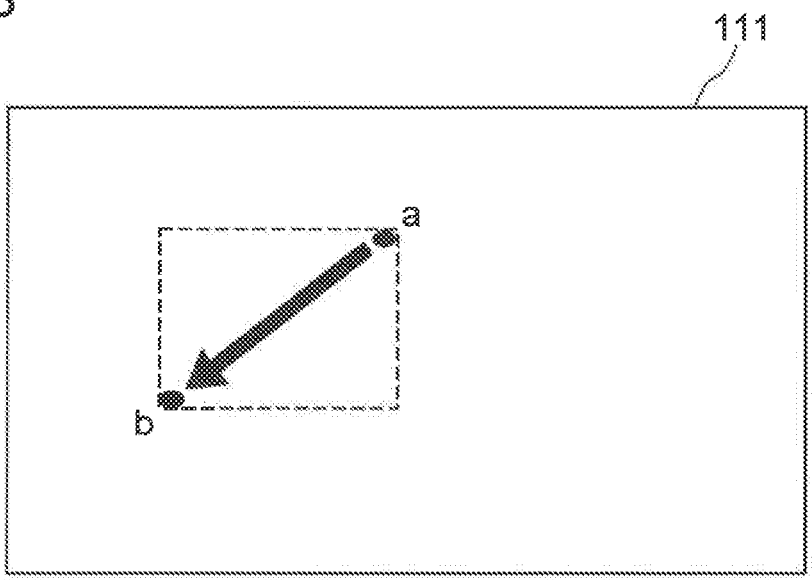
FIG. 16B is a diagram illustrating a meaning of a lower-left-direction swipe and a calculation example of a partial region used in the modified example of the second example embodiment of the present invention.

The lower-right-direction swipe refers to a tracing operation with a fingertip from a certain location (start point) a on the image 111 to another location (end point) b existing in a lower-right direction of the start point a, as illustrated by the arrow in FIG. 16A. Further, the lower-left-direction swipe refers to a tracing operation with a fingertip from a certain location (start point) a on the image 111 to another location (end point) b existing in a lower-left direction of the start point a, as illustrated by the arrow in FIG. 16B. When detecting a lower-right-direction swipe, the accepting unit 104 calculates, as a partial region, a rectangular region in which the start point a is the upper-left vertex and the end point b is the lower-right vertex as illustrated by the dashed line in FIG. 16A and accepts an input of the class 1 for the partial region. Further, when detecting a lower-left-direction swipe, the accepting unit 104 calculates, as a partial region, a rectangular region in which the start point a is the upper-right vertex and the end point b is the lower-left vertex as illustrated by the dashed line in FIG. 16B and accepts an input of the class 2 for the partial region.

In No. 2-5 of FIG. 14, the accepting unit 104 accepts an input of the class 0 by a left-direction flick, accepts an input of a class increment by a right-direction flick, accepts a calculation of a partial region of the class 1 by a lower-direction swipe, and accepts a calculation of a partial region of the class 2 by an upper-direction swipe.

Figure 17A:
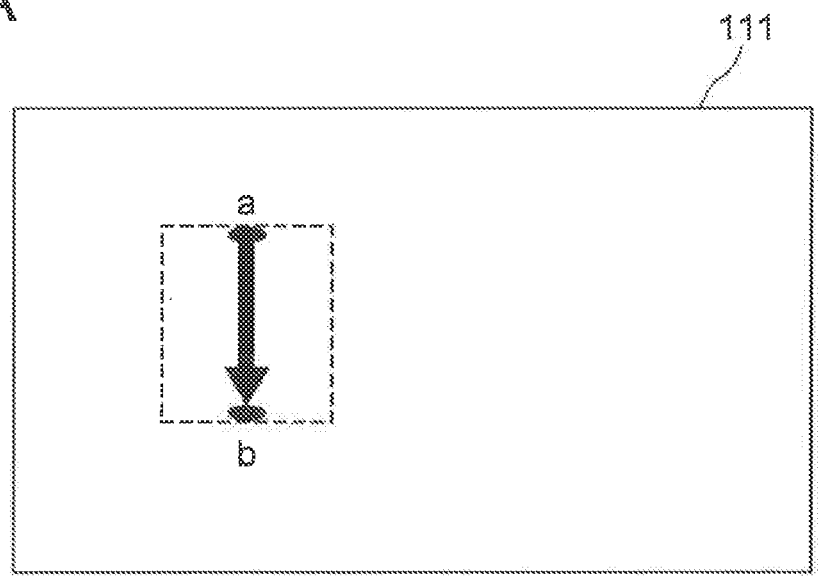
FIG. 17A is a diagram illustrating a meaning of a lower-direction swipe and a calculation example of a partial region used in the modified example of the second example embodiment of the present invention.
Figure 17B:
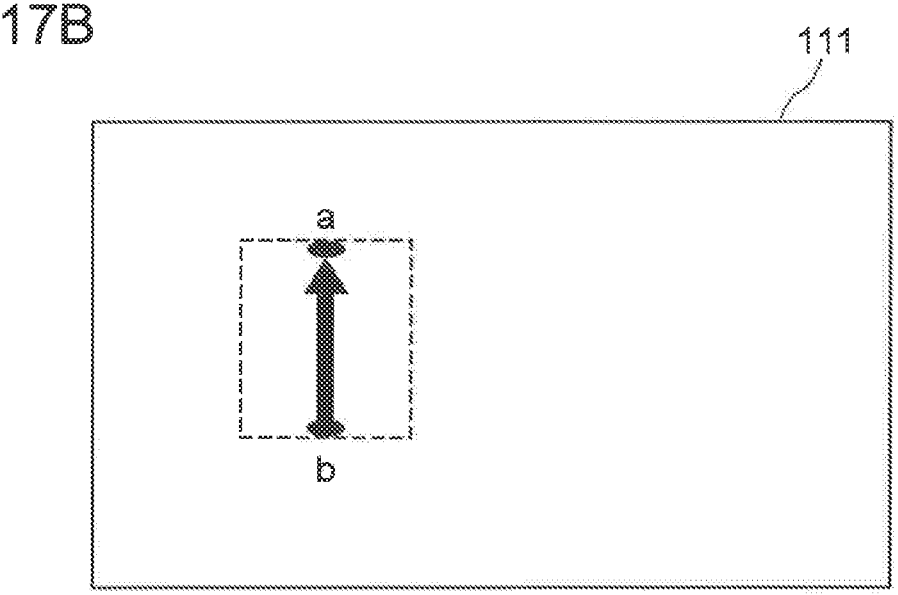
FIG. 17B is a diagram illustrating a meaning of an upper-direction swipe and a calculation example of a partial region used in the modified example of the second example embodiment of the present invention.

The lower-direction swipe refers to a tracing operation with a fingertip from a certain location (start point) a on the image 111 to another location (end point) b existing in a lower direction of the start point a, as illustrated by the arrow in FIG. 17A. Further, the upper-direction swipe refers to a tracing operation with a fingertip from a certain location (start point) b on the image 111 to another location (end point) a existing in an upper direction of the start point b, as illustrated by the arrow in FIG. 17B. When detecting a lower-direction swipe, the accepting unit 104 calculates a rectangle as illustrated by the dashed line in FIG. 17A as a partial region of the class 1. The rectangle is line-symmetric with respect to a swipe line, and a vertical length thereof is equal to a swipe length. Further, a horizontal length thereof is determined by multiplying the swipe length by a predetermined ratio. As the predetermined ratio, usable is a ratio of a horizontal length to a vertical length of a circumscribed rectangle of, for example, an object (a two-wheeled motor vehicle in the present example embodiment) of the class 1 as a typical shape. Further, when detecting an upper-direction swipe, the accepting unit 104 calculates a rectangle as illustrated by the dashed line in FIG. 17B as a partial region of the class 2. The rectangle is line-symmetric with respect to a swipe line, and a vertical length thereof is equal to a swipe length. Further, a horizontal length thereof is determined by multiplying the swipe length by a predetermined ratio. As the predetermined ratio, usable is a ratio of a horizontal length to a vertical length of a circumscribed rectangle of an object (a four-wheeled motor vehicle in the present example embodiment) of the class 2 as a typical shape.

In No. 2-6 of FIG. 14, the accepting unit 104 accepts an input of the class 0 by a pinch-in, accepts an input of a class increment by a pinch-out, accepts a calculation of a partial region of the class 1 by a lower-right-direction swipe, and accepts a calculation of a partial region of the class 2 by a lower-left-direction swipe.

In No. 2-7 of FIG. 14, the accepting unit 104 accepts an input of the class 0 by a tap, accepts an input of a class increment by a double tap, accepts a calculation of a partial region of the class 1 by a lower-right-direction swipe, and accepts a calculation of a partial region of the class 2 by a lower-left-direction swipe. These are illustrative and any combination of other optional gestures is usable.

In the second example embodiment and Nos. 2-1 to 2-7 of FIG. 14, the accepting unit 104 accepted an input of the class 0 by a first-type gesture and accepted an input of a class increment by a second-type gesture. However, the accepting unit 104 may accept an input of a decrement instead of the increment. In other words, in the second example embodiment and Nos. 2-1 to 2-7 of FIG. 14, the accepting unit 104 may accept an input of a class decrement by the second-type gesture.

In the second example embodiment, the accepting unit 104 accepted an input of the class 0 by a left click as a mouse gesture and accepted an input of a class increment by a right click. However, it is possible that a class and an operation are related to each other on a one-on-one basis and an input of the class 0, the class 1, or the class 2 may be accepted by one specific operation. With respect to a gesture type to accept an input of each class and a gesture type to accept a calculation of a partial region of each class, various combinations can be formed, as exemplified in the list of FIG. 18.

For example, in No. 2-11 illustrated in FIG. 18, the accepting unit 104 accepts an input of the class 0 by a left click as a mouse gesture, accepts an input of the class 1 by a right click, accepts an input of the class 2 by a double click, accepts a calculation of a partial region of the class 1 by a lower-right-direction drag-and-drop, and accepts a calculation of a partial region of the class 2 by a lower-left-direction drag-and-drop.

Further, No. 2-12 illustrated in FIG. 18 is different from No. 2-11 in gesture types, with which calculation of partial regions of the class 1 and class 2 is accepted. In No. 2-12, the accepting unit 104 accepts a calculation of a partial region of the class 1 by an upper-left-direction drag-and-drop and accepts a calculation of a partial region of the class 2 by an upper-right-direction drag-and-drop.

Further, in No. 2-13 illustrated in FIG. 18, the accepting unit 104 accepts an input of the class 0 by a flick as a touch gesture, accepts an input of the class 1 by a tap, accepts an input of the class 2 by a double tap, accepts a calculation of a partial region of the class 1 by a lower-right-direction swipe, and accepts a calculation of a partial region of the class 2 by a lower-left-direction swipe.

Further, No. 2-14 illustrated in FIG. 18 is different from No. 2-13 in gesture types to accept inputs of the classes 0, 1, and 2. In No. 2-14, the accepting unit 104 accepts an input of the class 0 by a left-direction flick, accepts an input of the class 1 by an upper-direction flick, and accepts an input of the class 2 by a lower-direction flick.

Further, in No. 2-15 illustrated in FIG. 18, the accepting unit 104 accepts an input of the class 0 by a tap, accepts an input of the class 1 by a pinch-in, accepts an input of the class 2 by a pinch-out, accepts a calculation of a partial region of the class 1 by a lower-direction swipe, and accepts a calculation of a partial region of the class 2 by an upper-direction swipe.

In the second example embodiment, the number of classes was three (the class 0, the class 1, and the class 2), but the second example embodiment is applicable to a two-class object detection device in which the number of classes is two (the class 0 and the class 1) and a multi-class object detection device in which the number of classes is four or more.

Third Example Embodiment

A third example embodiment of the present invention will describe an object detection device that accepts an input of a different class from the same operation depending on whether there is already a partial region that has, in the region, a location on an image subjected to the operation. The present example embodiment is different from the second example embodiment in the function of the accepting unit 104 and is basically similar to the second example embodiment in the others. Hereinafter, FIG. 1 that is the block diagram of the first example embodiment is borrowed to describe in detail a function of an accepting unit 104 preferable for the third example embodiment.

The accepting unit 104 has a function of displaying, through visualization, a detection result DB 103 of an image on the display device 120 and accepting an input of a correction from the operator.

The accepting unit 104 has a function of accepting a selection of a partial region and an input of a class for the selected partial region by an operation of the input device 130 for an image 111 displayed on the display device 120. In the present example embodiment, the selection of a partial region refers to both a selection of an existing partial region and a selection of a new partial region. The accepting unit 104 accepts the selection of the partial region on the basis of a location on the image 111 subjected to the operation of the input device 130 and accepts the input of the class on the basis of the type of the operation. Further, in the present example embodiment, even when the same operation is performed on the basis of whether there is an existing partial region including, in the region, a location on an image subjected to an operation, inputs of different classes are accepted. In the present example embodiment, the input device 130 is a mouse and the type of one operation includes a left click and a right click.

The accepting unit 104 accepts a selection of an existing partial region including, in the region, a location on the image 111 left-clicked or right-clicked. Further, the accepting unit 104 accepts, for the selected partial region, an input of the class 0 upon a left click and accepts, upon a right click, an input of a class obtained by incrementing the current class. The class obtained by incrementing the current class refers to the class 2 when the current class is the class 1, the class 0 when the current class is the class 2, and the class 1 when the current class is the class 0. The accepting unit 104 records the accepted class for the selected partial region in the corrected class column of the detection result DB 103. The above description is the same as the case in which a left click or a right click is performed in the first example embodiment.

Further, when there is not an existing partial region including, in a region thereof, a location on the image 111 left-clicked or right-clicked, the accepting unit 104 calculates a new rectangular partial region on the basis of a clicked location and accepts an input of the class 1 upon a left click and an input of the class 2 upon a right click for the partial region. For a method for calculating a new partial region on the basis of a clicked location, usable is the same method as the method for calculating a partial region of an object on the basis of a double-clicked location as described with reference to FIG. 15.

Figure 19:
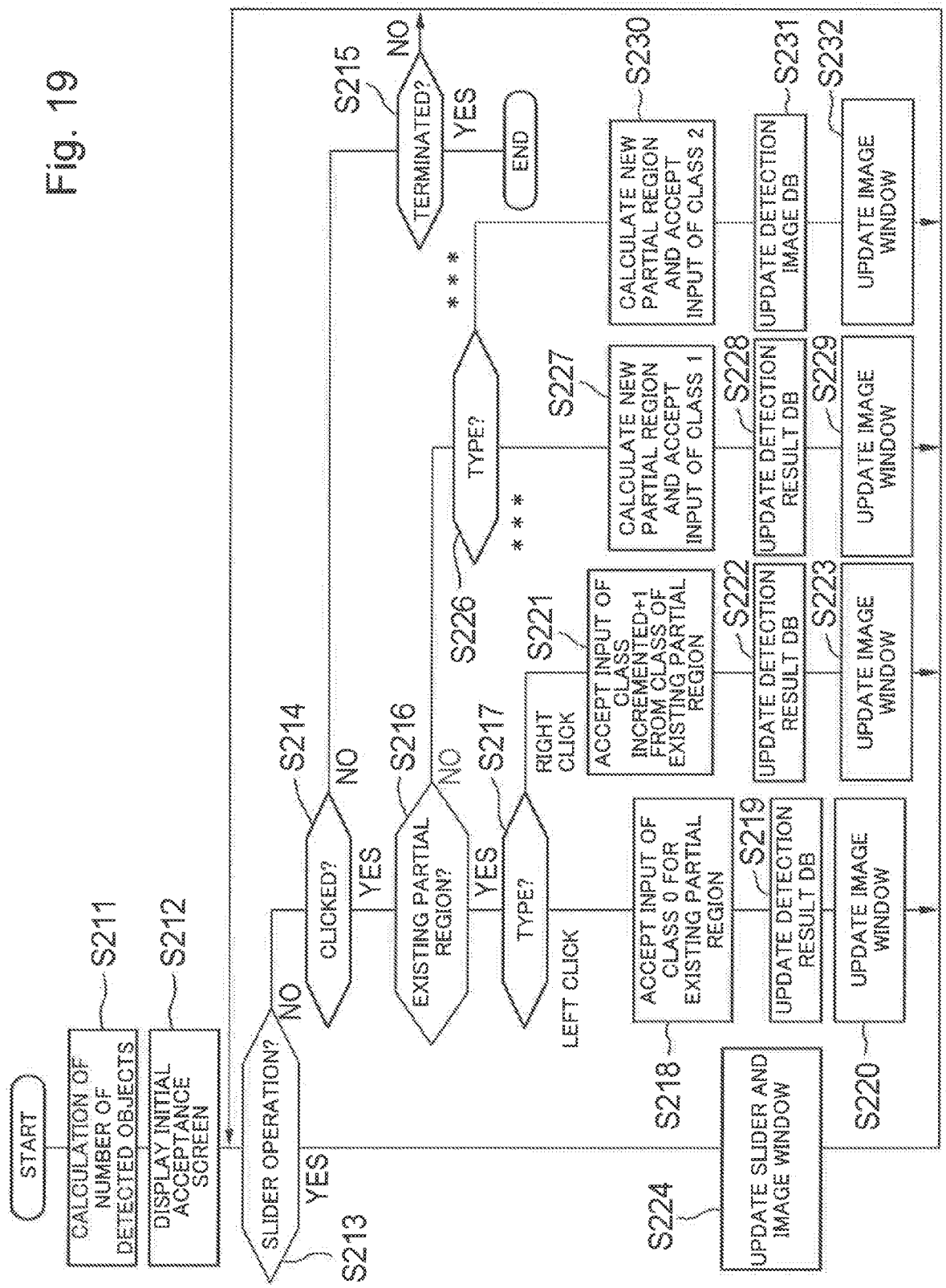
FIG. 19 is a flowchart illustrating the details of the operation of an accepting unit of an object detection device according to a third example embodiment of the present invention.

FIG. 19 is a flowchart illustrating details of an operation of the accepting unit 104. In FIG. 19, steps S211 to S224 and S226 to S232 are almost the same as steps S211 to S224 and S226 to S232 of FIG. 11, respectively. FIG. 19 is different from FIG. 11 in a point in which when it is determined that there is not an existing partial region including a clicked location in step S216, a movement is made to step S226. Note that step S226 of FIG. 11 determines the direction (type) of drag-and-drop, while step S226 of FIG. 19 determines the type of click. Hereinafter, with reference to FIG. 19, the operation of the accepting unit 104 will be described in detail by focusing on differences from FIG. 11.

The accepting unit 104 detects a left click or a right click for an image of the image window 124 (YES in step S214). At that time, when determining that there is not a partial region including a clicked location in the image (NO in step S216), the accepting unit 104 determines which one of a left click and a right click the type of the click is in order to determine an input of a class (step S226).

The accepting unit 104 calculates a new rectangular partial region upon a left click and accepts an input of the class 1 (step S227). The accepting unit 104 records a pair of the calculated partial region and the class 1 on the detection result DB 103 as one detection result (step S228). The accepting unit 104 updates the image window 124 of the acceptance screen 126 (step S229). The accepting unit 104 returns to processing of step S213.

Further, the accepting unit 104 calculates, upon a right click (step S226), a new rectangular partial region and accepts an input of the class 2 (step S230). The accepting unit 104 records a pair of the calculated partial region and the class 2 on the detection result DB 103 as one detection result (step S231). The accepting unit 104 updates the image window 124 of the acceptance screen 126 (step S232). The accepting unit 104 returns to processing of step S213.

In this manner, according to the present example embodiment, a good-quality teacher data can be efficiently created. The reason is that the accepting unit 104 displays, on the display device 120, an input image with indication that emphasizes a partial region of a detected object and accepts a selection of a partial region and an input of a class for the selected partial region by a click that is one operation of the input device 130. Further, the accepting unit 104 detects one operation that is a left click or a right click at a location that is not overlapped with an existing partial region and accepts a calculation of a new partial region and an input of the class 1 or the class 2.

Modified Examples of the Third Example Embodiment

In the third example embodiment, two-types of gestures that are a left click and a right click were used, but any combination of other types of mouse gestures and any combination of touch gestures are usable.

Fourth Example Embodiment

A fourth example embodiment of the present invention will describe an object detection device in which an input of a correct class for a misrecognized partial region and a selection of a correct partial region of an object are performed by an operation of an input device for an input image. The present example embodiment is different from the second example embodiment in the function of the accepting unit 104 and is basically similar to the second example embodiment in the others. Hereinafter, FIG. 1 that is the block diagram of the first example embodiment is borrowed to describe in detail a function of an accepting unit 104 preferable for the fourth example embodiment.

The accepting unit 104 has a function of displaying through visualization, a detection result DB 103 of an image on the display device 120 and accepting an input of a correction from the operator.

Figure 20:
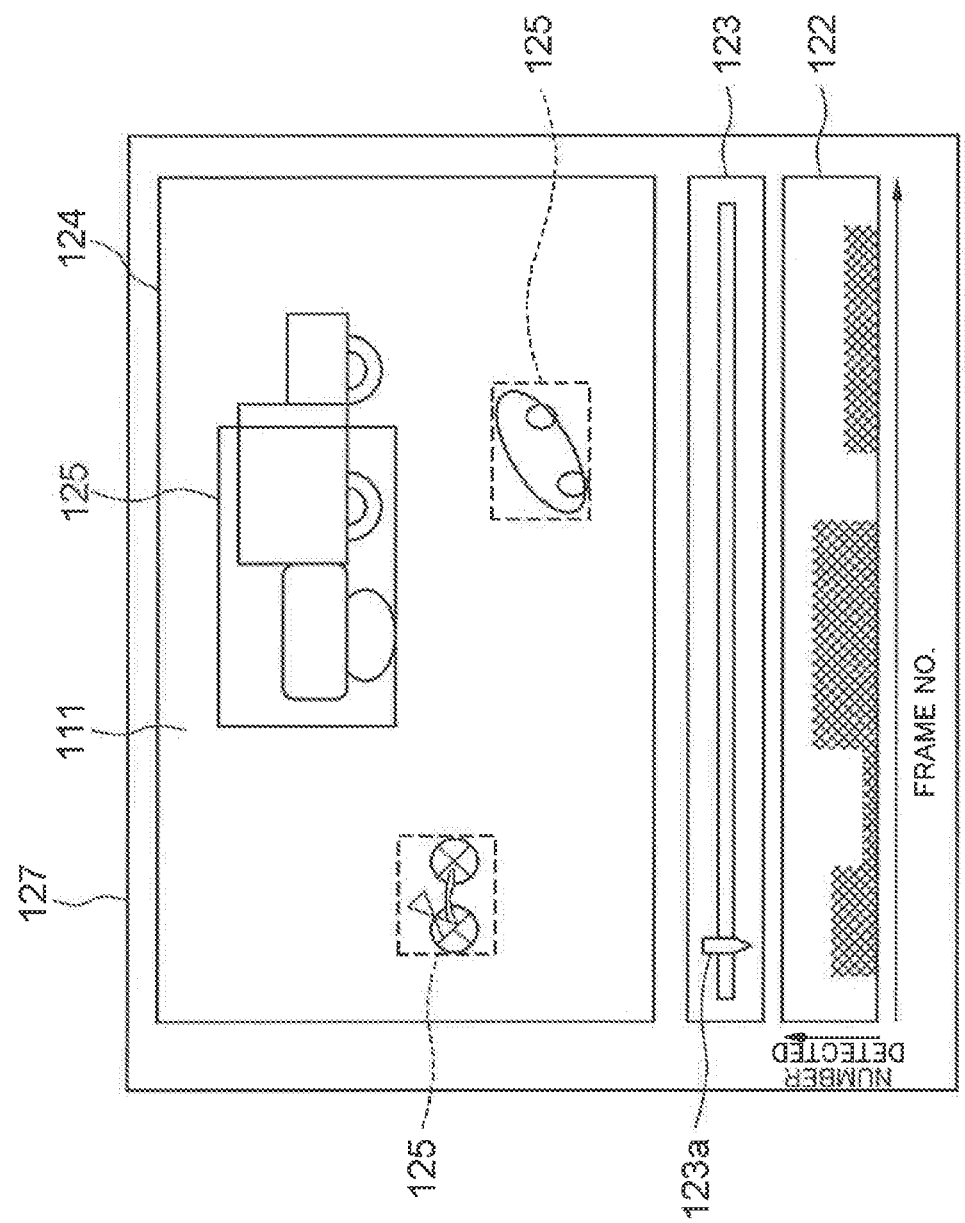
FIG. 20 is a diagram illustrating one example of an acceptance screen used in a fourth example embodiment of the present invention.

FIG. 20 illustrates one example of an acceptance screen 127 displayed on the display device 120 by the accepting unit 104. The acceptance screen 127 of this example is different from the acceptance screen 121 illustrated in FIG. 4 only in a location of a rectangular frame indicating an outer circumference of a partial region of a four-wheeled motor vehicle in an image 111 being displayed on the image window 124. The cause why the location of the rectangular frame is different results from a fact that when detecting an object using the dictionary 102 from the image 111, the detecting unit 101 erroneously detects a puddle or the like on the road as a part of a partial region of the object. In this example, the partial region is erroneously detected but a class therefor is correctly determined. However, there is also a case in which both a partial region and a class are erroneously detected. To improve such erroneous detections, it is necessary to create both teacher data that is an input/output pair of an erroneously detected partial region in the image 111 and the class 0 therefor and teacher data that is an input/output pair of a correct partial region of the four-wheeled motor vehicle in the image 111 and the class 2 therefor to learn the dictionary 102.

The accepting unit 104 has a function of accepting a selection of a partial region and an input of a class for the selected partial region by an operation of the input device 130 for the image 111 displayed on the display device 120. In the present example embodiment, the selection of a partial region refers to both a selection of an existing partial region and a selection of a new partial region. The accepting unit 104 accepts a selection of a partial region on the basis of a location on the image 111 subjected to an operation of the input device 130 and accepts an input of a class on the basis of the type of the operation. Further, in the present example embodiment, when a selection operation for a new partial region partially overlapped with an existing partial region is performed, an input of the class 0 is accepted for the existing partial region and an input of a class in accordance with the type of the operation is accepted for the new partial region. In the present example embodiment, the input device 130 is a mouse, and the type of one operation includes a left click, a right click, a lower-right-direction drag-and-drop, and a lower-left-direction drag-and-drop.

The accepting unit 104 accepts a selection of a partial region including, in the region, a location on the image 111 left-clicked or right-clicked. Further, the accepting unit 104 accepts, for the selected partial region, an input of the class 0 upon a left click and accepts, upon a right click, an input of a class obtained by incrementing the current class. The class obtained by incrementing the current class refers to the class 2 when the current class is the class 1, the class 0 when the current class is the class 2, and the class 1 when the current class is the class 0. The accepting unit 104 records the accepted class for the selected partial region in the corrected class column of the detection result DB 103. The above description is the same as the case in which a left click or a right click is performed in the first example embodiment.

Further, when detecting a lower-right-direction drag-and-drop, the accepting unit 104 calculates, as a partial region, a rectangular region in which a start point a is the upper-left vertex and an end point b is the lower-right vertex as illustrated by the dashed line of FIG. 10A and accepts an input of the class 1 for the partial region. Further, when detecting a lower-left-direction drag-and-drop, the accepting unit 104 calculates, as a partial region, a rectangular region in which a start point a is the upper-right vertex and an end point b is the lower-left vertex as illustrated by the dashed line of FIG. 10B and accepts an input of the class 2 for the partial region. Further, the accepting unit 104 records a newly-calculated partial region and information of a class therefor on the detection result DB 103 as one detection result. The above description is the same as the case in which lower-right-direction and lower-left-direction drag-and-drops are performed in the second example embodiment.

Figure 21:
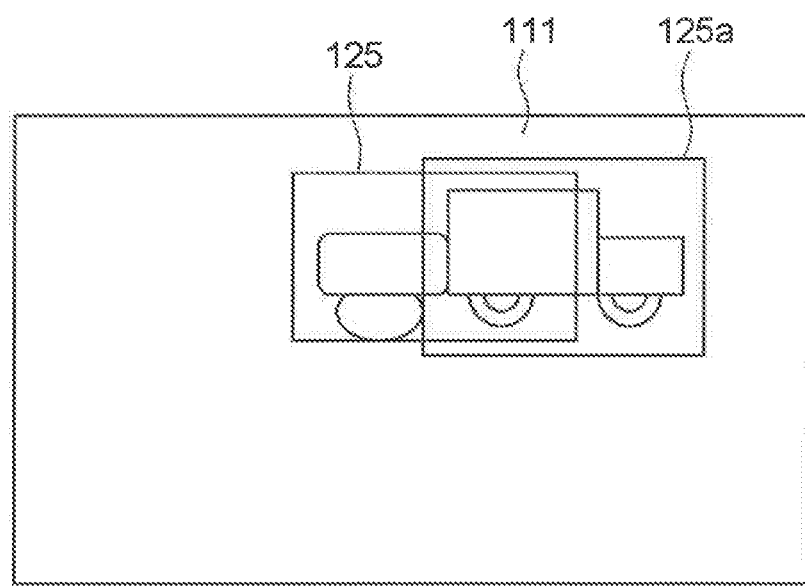
FIG. 21 is a diagram illustrating an example in which an accepting unit of an object detection device according to the fourth example embodiment of the present invention accepts an input of class 0 for an existing partial region partially overlapped with a newly-calculated partial region.

Further, the accepting unit 104 has a function of accepting an input of the class 0 for an existing partial region partially overlapped with the newly-calculated partial region. As illustrated in FIG. 21, for example, if a lower-left-direction (or lower-right-direction) drag-and-drop is performed on an image 111 that indicates a frame 125 that emphasizes a partial region of the class 2, the accepting unit 104 calculates a partial region 125a, formed by the drag-and-drop, partially overlapped with the frame 125, then, accepts an input of the class 0 for the existing partial region related to the frame 125.

Figure 22:
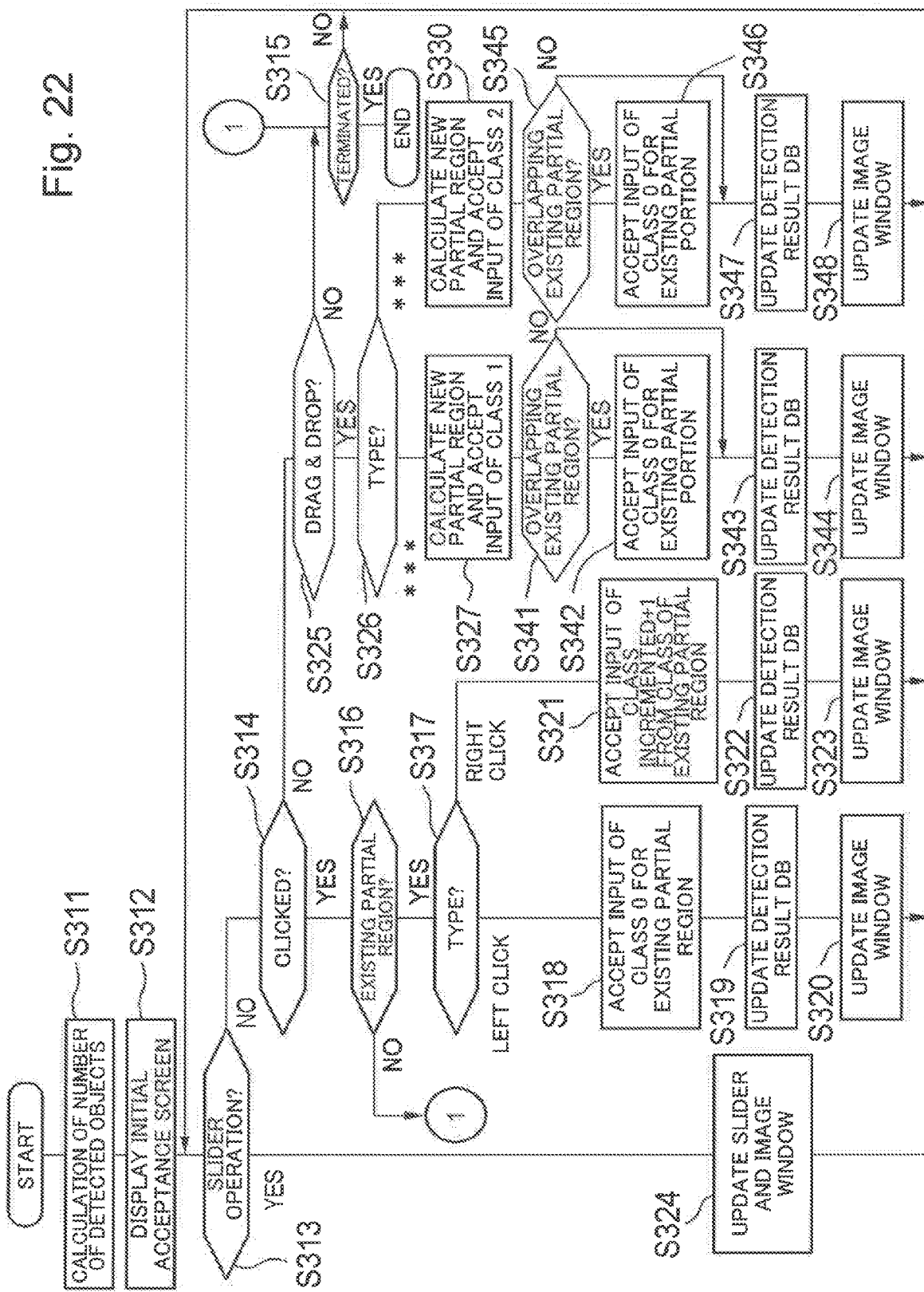
FIG. 22 is a flowchart illustrating details of an operation of the accepting unit of the object detection device according to the fourth example embodiment of the present invention.

FIG. 22 is a flowchart illustrating details of an operation of the accepting unit 104. In FIG. 22, steps S311 to S327 and S330 are the same as steps S211 to S327 and S230 of FIG. 11, respectively. Hereinafter, with reference to FIG. 22, the operation of the accepting unit 104 will be described in detail by focusing on differences from FIG. 11.

When accepting an input of the class 1 for a newly-calculated partial region (step S327), the accepting unit 104 determines whether there is an existing partial region partially overlapped with the new partial region on the image 111 (step S341). This determination is performed by examining whether there is a detection result of an existing partial region partially overlapped with the new partial region in the detection result DB 103 related to the image 111. When there is such an existing partial region, the accepting unit 104 accepts an input of the class 0 for the partial region (step S342) and moves to step S343. When there is not such an existing partial region, the accepting unit 104 skips processing of step S342 and moves to step S343. In step S343, the accepting unit 104 updates the detection result DB 103 in accordance with the acceptance results of step S327 and step S342. In other words, the accepting unit 104 records, as one detection result, a pair of the newly-calculated partial region and the class 1 on the detection result DB 103 on the basis of the acceptance result of step S327. Further, the accepting unit 104 records the class 0 for a corrected class of the existing partial region on the basis of the detection result of step S342. The accepting unit 104 updates the image 111 on the image window 124 in accordance with the update of the detection result DB 103 of step S343 (step S344). The accepting unit 104 returns to processing of step S313.

Further, when accepting an input of the class 2 for a newly-calculated partial region (step S330), the accepting unit 104 determines whether there is an existing partial region partially overlapped with the new partial region on the image 111 (step S345). When there is such an existing partial region, the accepting unit 104 accepts an input of the class 0 for the partial region (step S346) and moves to step S347. When there is not such an existing partial region, the accepting unit 104 skips processing of step S346 and moves to step S347. In step S347, the accepting unit 104 updates the detection result DB 103 in accordance with the acceptance results of step S330 and step S346. In other words, the accepting unit 104 records, as one detection result, a pair of the newly-calculated partial region and the class 2 on the detection result DB 103 on the basis of the acceptance result of step S330. Further, the accepting unit 104 records the class 0 for a corrected class of the existing partial region on the basis of the acceptance result of step S346. The accepting unit 104 updates the image 111 on the image window 124 in accordance with the update of the detection result DB 103 of step S347 (step S348). The accepting unit 104 returns to processing of step S313.

FIG. 23A and FIG. 23B each are an illustrative diagram of step S347 executed by the accepting unit 104. FIG. 23A illustrates a detection result DB 103 generated by the detecting unit 101, and FIG. 23B illustrates a detection result DB 103 updated by the accepting unit 104. In FIG. 23A and FIG. 23B, a partial region of a rectangle in which the upper-left vertex is (x7,y7) and the lower-right vertex is (x8,y8) is newly added as the class 2. Further, a class of an existing partial region of a rectangle in which the upper-left vertex is (x1,y1) and the lower-right vertex is (x2,y2) is corrected from the class 2 to the class 0. The case of step S343 executed by the accepting unit 104 differs in a point in which a corrected class of a newly-added partial region is the class 1.

Figure 24A:
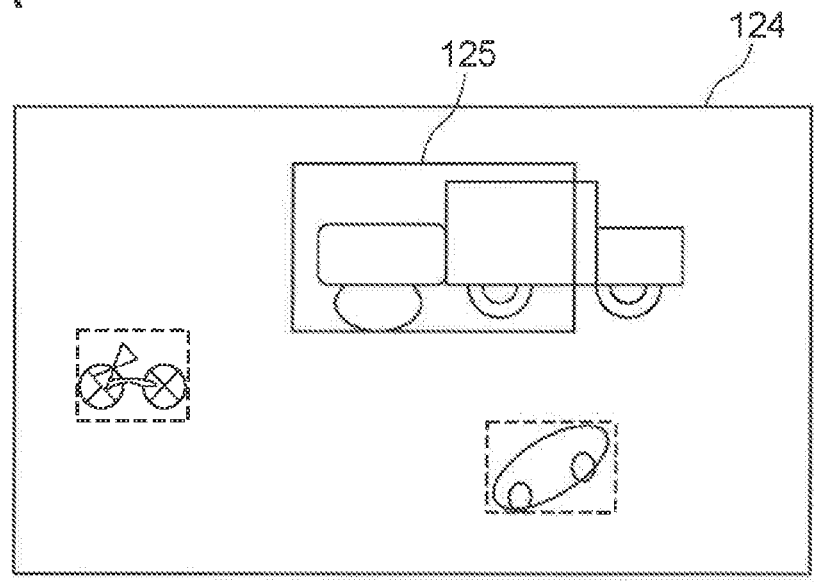
FIG. 24A is a diagram illustrating a pre-update example of an image window obtained by the accepting unit of the object detection device according to the fourth example embodiment of the present invention.
Figure 24B:
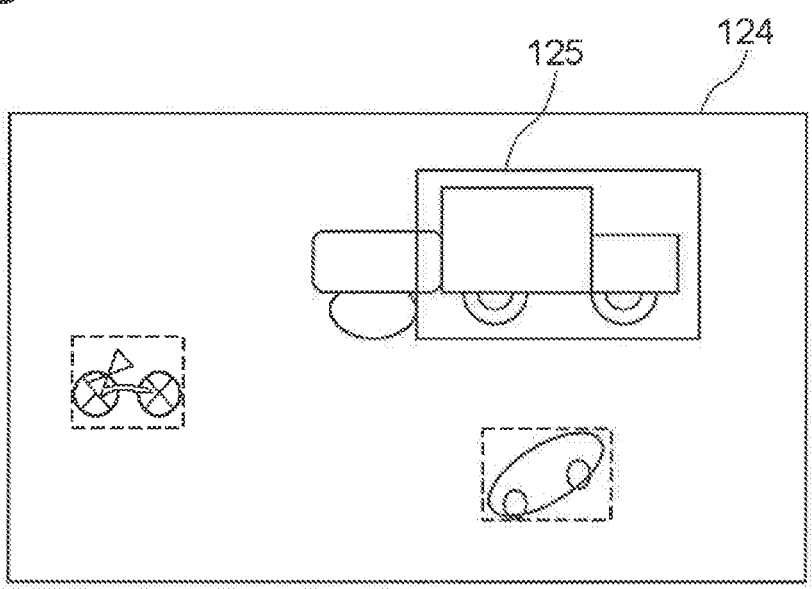
FIG. 24B is a diagram illustrating a post-update example of the image window obtained by the accepting unit of the object detection device according to the fourth example embodiment of the present invention.

FIG. 24A and FIG. 24B each are an illustrative diagram of step S348 executed by the accepting unit 104. FIG. 24A illustrates a pre-update image window 124, and FIG. 24B illustrates a post-update image window 124. On the post-update image window 124, a rectangular frame 125 using a solid line that emphasizes a newly-added partial region is drawn, and a frame, having been displayed on the pre-update image window 124, partially overlapped with the rectangular frame 125 is hidden. The case of step S344 executed by the accepting unit 104 differs in a point in which a rectangular frame that emphasizes a newly-added partial region is drawn by a dashed line on the post-update image window 124.

In this manner, according to the present example embodiment, a good-quality teacher data can be efficiently created. The reason is that the accepting unit 104 displays, on the display device 120, an input image with indication that emphasizes a partial region of a detected object and accepts a selection of a partial region and an input of a class for the selected partial region by a click that is one operation of the input device 130. The reason also includes that the accepting unit 104 detects one operation that is a lower-right-direction or lower-left-direction drag-and-drop on an image and accepts a calculation of a new partial region and an input of the class 1 or the class 2. Further, the reason also includes that the accepting unit 104 accepts an input of the class 0 for an existing partial region partially overlapped with the newly-calculated partial region.

Modified Examples of the Fourth Example Embodiment

The configuration of the fourth example embodiment can be subjected to the same modifications as the examples described in the modified examples of the second example embodiment.

Fifth Example Embodiment

Figure 25:
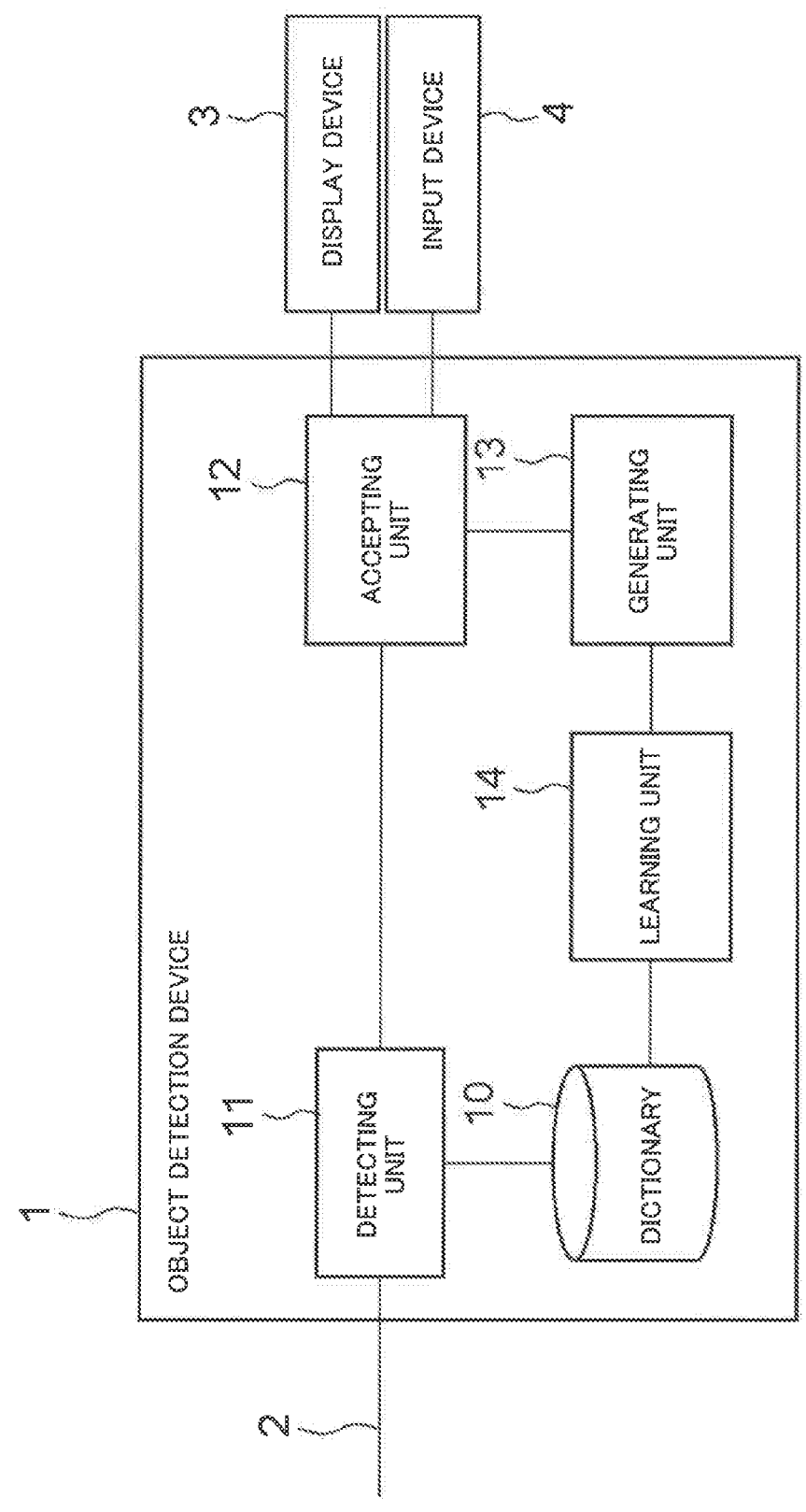
FIG. 25 is a block diagram of an object detection device according to a fifth example embodiment of the present invention.

A fifth example embodiment of the present invention will be described. Referring to FIG. 25, an object detection device 1 according to the present example embodiment has a function of detecting objects from an input image 2. The object detection device 1 includes a dictionary 10 and includes, as main functional units, a detecting unit 11, an accepting unit 12, a generating unit 13, and a learning unit 14. Further, the object detection device 1 is connected with a display device 3 and an input device 4.

The detecting unit 11 has a function of detecting objects from an input image 2 by referring to the dictionary 10. The accepting unit 12 has a function of displaying, on the display device 3, the input image 2 with indication that emphasizes partial regions of objects that were detected by the detecting unit 11 and accepting a selected partial region and a class corresponding to the selected partial region through one operation of the input device 4. The generating unit 13 has a function of generating teacher data from the image of the selected partial region and the input class. The learning unit 14 has a function of learning the dictionary 10 based on the teacher data generated by the generating unit 13 to upgrade the dictionary 10.

Next, an operation of the object detection device 1 according to the present example embodiment will be described. The detecting unit 11 of the object detection device 1 detects objects from the input image 2 by referring the dictionary 10 and notifies the accepting unit 12 of the detection result. The accepting unit 12 displays, on the display device 3, the input image 2 with indication that emphasizes partial regions of objects that were detected by the detecting unit 11. Then, the accepting unit 12 accepts a selected partial region and a class corresponding to the selected partial region through one operation of the input device 4, and notifies the result to the generating unit 13. The generating unit 13 generates teacher data from the image of the selected partial region and the input class and notifies the learning unit 14. The learning unit 14 learns the dictionary 10 based on the teacher data generated by the generating unit 13 and upgrade the dictionary 10.

In this manner, according to the present example embodiment, a good-quality teacher can be efficiently generated.

This is because the accepting unit 12 displays, on the display device 3, the input image 2 with indication that emphasizes partial regions of detected objects, and, further, the accepting unit 12 accepts a selected partial region and a class corresponding to the selected partial region through one operation of clicking of the input device 4.

The present example embodiment can be subjected to various types of additions/modifications described below while any one of the configurations described above is used as a base.

The accepting unit 12 may be configured to accept a selection of a partial region on the basis of a location on the input image 2 subjected to one operation.

Further, the accepting unit 126 may be configured to accept a selection of a partial region that includes, in the region, a location on the input image 2 subjected to one operation, and, if there is no partial region that includes, in the region, the location on the input image 2 subjected to the one operation, calculates a partial region of the object on the basis of the location on the input image 2 subjected to the one operation.

Further, the accepting unit 12 may be configured to accept an input of a class by the type of one operation.

The accepting unit 12 may be configured to accept an input of a preset first class when the type of one operation is a first type, and accept an input of a class that is incremented or decremented from the current class of a partial region when the type of the one operation is a second type.

The accepting unit 12 may be configured to accept an input of a different class depending on whether there is a partial region that has, in the region, a location on the input image 2 subjected to one operation.

The accepting unit 12 may be configured to accept an input of a first class when there is a partial region that has, in the region, a location on the input image 2 subjected to one operation and accept an input of a second class when there is no such partial region.

The accepting unit 12 may be configured to accept an input of a first class for an existing partial region when there is the partial region that has, in the region, a location on the input image 2 subjected to one operation, as well as, calculate a partial region of an object on the basis of the location on the input image subjected to the one operation and accept an input of a second class for the calculated partial region.

The accepting unit 12 may be configured to determine the second class by the type of the one operation.

One operation of the input device 4 may be a single mouse gesture. Alternatively, one operation of the input device 4 may be a single touch gesture.

The accepting unit 12 may be configured to hide the indication that emphasizes the partial region of a detected object if the partial region of the detected object includes the same location and pre-input class as those of a partial region for which the class has previously been input.

Sixth Example Embodiment

Figure 27:
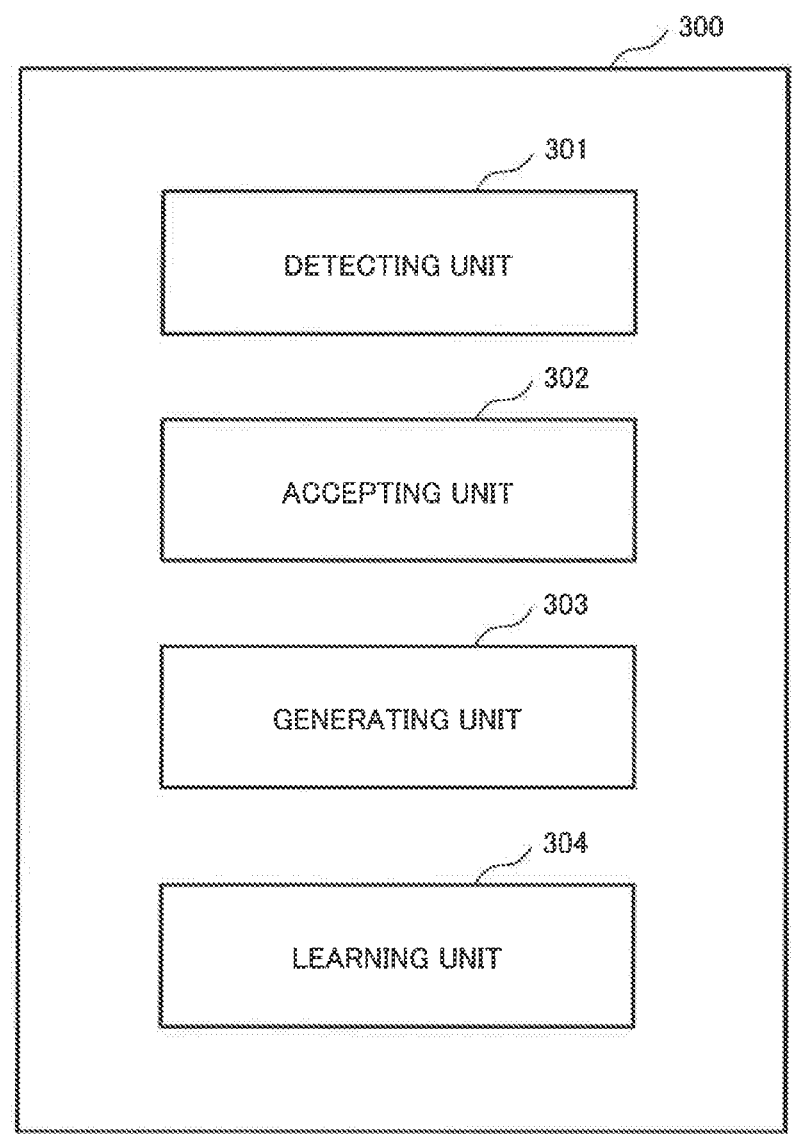
FIG. 27 is a block diagram of an object detection device according to a sixth example embodiment of the present invention.

An object detecting device 300 according to a sixth example embodiment of the present invention will be described with reference to FIG. 27. The object detecting device 300 includes a detecting unit 301, an accepting unit 302, a generating unit 303, and a learning unit 304. The detecting unit 301 detects an object from an input image by referring to a dictionary.

The accepting unit 302 displays on a display device an input image with indication that emphasizes a partial region of a detected object and accepts a selection of a partial region and an input of a class for the partial region through a single operation of the input device.

The generating unit 303 generates teacher data from the image of the selected partial region and input class.

The learning unit 304 learns a dictionary based on the teacher data.

According to the sixth example embodiment, a good-quality teacher data can be efficiently created. This is because the accepting unit 302 displays on a display device an input image with indication that emphasizes a partial region of a detected object and accepts a selection of a partial region and a class for the selected partial region through one operation of the input device.

The above description explains the invention with the described example embodiments as model examples. However, the invention is not limited to the above-described example embodiments. That is, the invention can be applied to a variety of embodiments that can be understood by those skilled in the art within the scope of the invention.

INDUSTRIAL APPLICABILITY

The present invention is usable for an object detection device that detects an object such as a person, a car, and the like from a video of a road captured by a monitoring camera, on the basis of a dictionary.

REFERENCE SIGNS LIST

1 Object detection device
2 Input image
3 Display device
4 Input device
10 Dictionary
11 Detecting unit
12 Accepting unit
13 Generating unit
14 Learning unit
100 Object detection device
101 Detecting unit
102 Dictionary
103 Detection result DB
104 Accepting unit
105 Generating unit
106 Teacher data memory
107 Learning unit
111 Image
112, 113, 114, 115 Search window
120 Display device
121 Acceptance screen
122 Graph
123 Slider
123a Slide bar
124 Image window
125 Rectangular frame
125a Partial region
126, 127 Acceptance screen
130 Input device
131 Object
132 Circumscribed rectangle

The invention claimed is:
1. A system comprising:
one or more memories storing instructions; and one or more processors configured to execute the instructions to perform:
receiving an input of a partial region and a class, the partial region formed in an image by the input, the class defined based on a type of an input device operation;
outputting a graph indicating a relation between a plurality of images including the image and a plurality of regions including the partial region; and
outputting the plurality of the region partial regions corresponding to the class.

2. The system according to claim 1, wherein the input device operation includes a mouse gesture.

3. The system according to claim 1, wherein the class indicates a category relating to an object.

4. The system according to claim 3, wherein the class includes the category indicating a four-wheeled motor vehicle.

5. The system according to claim 1, wherein the one or more processors configured to execute the instructions to perform:
generating data based on the plurality of the partial regions and the class,
wherein the outputting the plurality of the partial regions indicates outputting the generated data.

6. The system according to claim 1, wherein the one or more processors configured to execute the instructions to perform:
generating machine learning training data based on the plurality of the partial regions and the class,
wherein the outputting the plurality of the partial regions indicates outputting the machine learning training data.

7. The system according to claim 1, wherein the partial region is generated by the input of an operator.

8. The system according to claim 7, wherein the partial region is designated by selecting at least two points in the image.

9. The system according to claim 1, wherein the plurality of images is included in a video.

10. The system according to claim 1, wherein the partial region is a part of the image.

11. An information processing method comprising:
receiving an input of a partial region and a class, the partial region formed in an image by the input, the class defined based on a type of an input device operation;
outputting a graph indicating a relation between a plurality of images including the image and a plurality of regions including the partial region; and
outputting the plurality of the partial regions corresponding to the class.

12. The information processing method according to claim 11, wherein
the input device operation includes a mouse gesture.

13. The information processing method according to claim 11, wherein
the class indicates a category relating to an object.

14. The information processing method according to claim 11 further comprising:
generating data based on the plurality of the partial regions and the class,
wherein the outputting the plurality of the partial regions indicates outputting the generated data.

15. The information processing method according to claim 11 further comprising:
generating machine learning training data based on the plurality of the partial regions and the class,
wherein the outputting the plurality of the partial regions indicates outputting the machine learning training data.

16. The information processing method according to claim 11, wherein the partial region is generated by the input of an operator.

17. The information processing method according to claim 16, wherein the partial region is designated by selecting at least two points in the image.

18. The information processing method according to claim 11, wherein the plurality of images is included in a video.

19. The information processing method according to claim 11, wherein the partial region is a part of the image.

20. A non-transitory computer-readable recording medium, storing a computer program instruction for causing a computer to implement functions of:
receiving an input of a partial region and a class, the partial region formed in an image by the input, the class defined based on a type of an input device operation;
outputting a graph indicating a relation between a plurality of images including the image and a plurality of regions including the partial region; and
outputting the plurality of the partial regions corresponding to the class.

21. The non-transitory computer-readable recording medium according to claim 20, wherein
the input device operation includes a mouse gesture.

22. The non-transitory computer-readable recording medium according to claim 20, wherein
the class indicates a category relating to an object.

23. The non-transitory computer-readable recording medium according to claim 22, wherein
the class includes the category indicating a four-wheeled motor vehicle.

24. The non-transitory computer-readable recording medium according to claim 20, wherein the computer program instruction for causing a computer to implement functions of:
generating data based on the plurality of the partial regions and the class,
wherein the outputting the plurality of the partial regions indicates outputting the generated data.

25. The non-transitory computer-readable recording medium according to claim 20, wherein the computer program instruction for causing a computer to implement functions of:
generating machine learning training data based on the plurality of the partial regions and the class,
wherein the outputting the plurality of the partial regions indicates outputting the machine learning training data.

26. The non-transitory computer-readable recording medium according to claim 20, wherein the partial region is generated by the input of an operator.

27. The non-transitory computer-readable recording medium according to claim 26, wherein the partial region is designated by selecting at least two points in the image.

28. The non-transitory computer-readable recording medium according to claim 20, wherein the plurality of images is included in a video.

29. The non-transitory computer-readable recording medium according to claim 20, wherein the partial region is a part of the image.

* * * * *